US008554055B2

(12) United States Patent
Isobe et al.

(10) Patent No.: US 8,554,055 B2
(45) Date of Patent: Oct. 8, 2013

(54) EDITING DEVICE, EDITING METHOD AND EDITING PROGRAM, AND DATA PROCESSING DEVICE, DATA PROCESSING METHOD AND DATA PROCESSING PROGRAM

(75) Inventors: Yukio Isobe, Kanagawa (JP); Atsushi Mae, Kanagawa (JP); Naoki Morimoto, Tokyo (JP); Kenichiro Nagao, Tokyo (JP)

(73) Assignee: Sony Corporation, Tokyo (JP)

( * ) Notice: Subject to any disclaimer, the term of this patent is extended or adjusted under 35 U.S.C. 154(b) by 1197 days.

(21) Appl. No.: 12/057,054

(22) Filed: Mar. 27, 2008

(65) Prior Publication Data

US 2008/0298768 A1 Dec. 4, 2008

(30) Foreign Application Priority Data

May 31, 2007 (JP) .................................. 2007-144458

(51) Int. Cl.
*H04N 5/782* (2006.01)

(52) U.S. Cl.
USPC ..................................... 386/279; 386/E5.001

(58) Field of Classification Search
USPC .................................................... 386/52, 279
See application file for complete search history.

(56) References Cited

U.S. PATENT DOCUMENTS

| 6,944,390 | B1 * | 9/2005 | Eubanks ....................... 386/281 |
| 7,555,715 | B2 * | 6/2009 | Randall et al. ................. 715/249 |
| 7,865,060 | B2 * | 1/2011 | Ikeda et al. .................... 386/241 |
| 2002/0003941 | A1 * | 1/2002 | Hatae et al. ..................... 386/46 |
| 2005/0175317 | A1 * | 8/2005 | Chung et al. .................... 386/52 |
| 2006/0013564 | A1 * | 1/2006 | Hamada et al. ................. 386/95 |
| 2006/0088282 | A1 | 4/2006 | Takagi |
| 2007/0047923 | A1 * | 3/2007 | Eklund et al. ................. 386/125 |

FOREIGN PATENT DOCUMENTS

| JP | 2002-324351 | 11/2002 |
| JP | 2003-109300 | 4/2003 |
| JP | 2005-244621 | 9/2005 |
| JP | 2006-344321 | 12/2006 |
| WO | WO2005/093746 A1 | 10/2005 |
| WO | WO2006/109718 A1 | 10/2006 |

OTHER PUBLICATIONS

Blu-ray Disc, "White Paper Blu-ray Disc Format, 2.A Logical and Audio Visual Application Format Specifications for BD-RE", Aug. 31, 2004, pp. 1-26, XP-002353735.
Blu-ray Disc, "White Paper Blu-ray Disc Format, 2.B Audio Visual Application Format Specifications for BD-ROM", Aug. 31, 2004, pp. 1-35, XP-002315435.

* cited by examiner

*Primary Examiner* — Peter Shaw
*Assistant Examiner* — Dao Ho
(74) *Attorney, Agent, or Firm* — Oblon, Spivak, McClelland, Maier & Neustadt, L.L.P.

(57) ABSTRACT

An editing device dubs stream data stored in a second recording medium. A recording unit records the specified range of stream data in a stream file in the first recording medium, based on management information recorded in the second recording medium. A stream information file in which a stream file and stream information are stored, and a playback list file in which playback section data and mark information indicating the playback point-in-time information can be stored, are recorded as management information. A management information is generated based on the relation between the specified range and the playback section data and stream information corresponding to the specified range.

16 Claims, 35 Drawing Sheets

FIG. 7

| SYNTAX | DATA LENGTH (BITS) | MNEMONICS |
|---|---|---|
| Index table file { | | |
|     TypeIndicator | 8 * 4 | bslbf |
|     TypeIndicator2 | 8 * 4 | bslbf |
|     IndexesStartAddress | 32 | uimsbf |
|     ExtensionDataStartAddress | 32 | uimsbf |
|     reserved | 192 | bslbf |
|     blkAppInfoBDMV() | | |
|     for (i=0; i<N1; i++) { | | |
|         padding_word | 16 | bslbf |
|     } | | |
|     blkIndexes() | | |
|     for (i=0; i<N2; i++) { | | |
|         padding_word | 16 | bslbf |
|     } | | |
|     blkExtensionData() | | |
|     for (i=0; i<N3; i++) { | | |
|         padding_word | 16 | bslbf |
|     } | | |
| } | | |

FIG. 8

| SYNTAX | DATA LENGTH (BITS) | MNEMONICS |
|---|---|---|
| blkIndexes() { | | |
|     Length | 32 | uimsbf |
|     FirstPlaybackTitle() { | | |
|         reserved | 1 | bslbf |
|         '1' | 1 | bslbf |
|         reserved | 31 | bslbf |
|         '1' | 1 | bslbf |
|         reserved | 14 | bslbf |
|         FirstPlaybackTitleMobjIDRef | 16 | uimsbf |
|         reserved | 32 | bslbf |
|     } | | |
|     MenuTitle() { | | |
|         reserved | 1 | bslbf |
|         '1' | 1 | bslbf |
|         reserved | 31 | bslbf |
|         '1' | 1 | bslbf |
|         reserved | 14 | bslbf |
|         MenuTitleMobjIDRef | 16 | uimsbf |
|         reserved | 32 | bslbf |
|     } | | |
|     NumberOfTitles | 16 | uimsbf |
|     for (title_id=0; title_id < NumberOfTitles; title_id++) { | | |
|         MovieTitle[title_id]() { | | |
|             reserved | 1 | bslbf |
|             '1' | 1 | bslbf |
|             reserved | 46 | bslbf |
|             MovieTitleMobjIDRef[title_id] | 16 | uimsbf |
|             reserved | 32 | bslbf |
|         } | | |
|     } | | |
| } | | |

FIG. 9

| SYNTAX | DATA LENGTH (BITS) | MNEMONICS |
|---|---|---|
| MovieObject file { | | |
|     TypeIndicator | 8 * 4 | bslbf |
|     TypeIndicator2 | 8 * 4 | bslbf |
|     ExtensionDataStartAddress | 32 | uimsbf |
|     reserved | 224 | bslbf |
|     blkMovieObjects() | | |
|     for (i=0; i<N1; i++) { | | |
|         padding_word | 16 | bslbf |
|     } | | |
|     blkExtensionData() | | |
|     for (i=0; i<N2; i++) { | | |
|         padding_word | 16 | bslbf |
|     } | | |
| } | | |

FIG. 10

| SYNTAX | DATA LENGTH (BITS) | MNE-MONICS |
|---|---|---|
| blkMovieObjects() { | | |
|   Length | 32 | uimsbf |
|   reserved | 32 | bslbf |
|   NumberOfMobjs | 16 | uimsbf |
|   for (mobj_id=0; mobj_id<NumberOfMobjs; mobj_id++) { | | |
|     MovieObject[mobj_id]() { | | |
|       TerminalInfo() { | | |
|         '1' | 1 | bslbf |
|         reserved | 15 | bslbf |
|       } | | |
|       NumberOfNavigationCommands[mobj_id] | 16 | uimsbf |
|       for (command_id=0; command_id<NumberOfNavigationCommands[mobj_id]; command_id++){ | | |
|         NavigationCommand[mobj_id][command_id] | 96 | bslbf |
|       } | | |
|     } | | |
|   } | | |
| } | | |

FIG. 11

| SYNTAX | DATA LENGTH (BITS) | MNEMONICS |
|---|---|---|
| Movie PlayList file { | | |
|     TypeIndicator | 8 * 4 | bslbf |
|     TypeIndicator2 | 8 * 4 | bslbf |
|     PlayListStartAddress | 32 | uimsbf |
|     PlayListMarkStartAddress | 32 | uimsbf |
|     ExtensionDataStartAddress | 32 | uimsbf |
|     reserved | 160 | bslbf |
|     blkAppInfoPlayList() | | |
|     for (i=0; i<N1; i++) { | | |
|         padding_word | 16 | bslbf |
|     } | | |
|     blkPlayList() | | |
|     for (i=0; i<N2; i++) { | | |
|         padding_word | 16 | bslbf |
|     } | | |
|     blkPlayListMark() | | |
|     for (i=0; i<N3; i++) { | | |
|         padding_word | 16 | bslbf |
|     } | | |
|     blkExtensionData() | | |
|     for (i=0; i<N4; i++) { | | |
|         padding_word | 16 | bslbf |
|     } | | |
| } | | |

FIG. 12

| SYNTAX | DATA LENGTH (BITS) | MNEMONICS |
|---|---|---|
| blkPlayList() { | | |
|     Length | 32 | uimsbf |
|     reserved | 16 | bslbf |
|     NumberOfPlayItems | 16 | uimsbf |
|     NumberOfSubPaths | 16 | uimsbf |
|     for(PlayItem_id=0;<br>        PlayItem_id<NumberOfPlayItems; PlayItem_id++) { | | |
|         blkPlayItem() | | |
|     } | | |
|     for(SubPath_id=0;<br>        SubPath_id<NumberOfSubPaths; SubPath_id++) { | | |
|         blkSubPath() | | |
|     } | | |
| } | | |

FIG. 13

| SYNTAX | DATA LENGTH (BITS) | MNEMONICS |
|---|---|---|
| blkPlayItem() { | | |
|     Length | 16 | uimsbf |
|     ClipInformationFileName | 8 * 5 | bslbf |
|     ClipCodecIdentifier | 8 * 4 | bslbf |
|     reserved | 12 | bslbf |
|     ConnectionCondition | 4 | bslbf |
|     RefToSTCID | 8 | uimsbf |
|     INTime | 32 | uimsbf |
|     OUTTime | 32 | uimsbf |
|     blkUOMaskTable() | | |
|     PlayItemRandomAccessFlag | 1 | bslbf |
|     reserved | 7 | bslbf |
|     StillMode | 8 | bslbf |
|     if (StillMode== 0x01){ | | |
|         StillTime | 16 | uimsbf |
|     } else { | | |
|         reserved | 16 | bslbf |
|     } | | |
|     blkSTNTable() | | |
| } | | |

FIG. 15

| SYNTAX | DATA LENGTH (BITS) | MNEMONICS |
|---|---|---|
| blkPlayListMark() { | | |
|     Length | 32 | uimsbf |
|     NumberOfPlayListMarks | 16 | uimsbf |
|     for(PL_mark_id=0;<br>        PL_mark_id< NumberOfPlayListMarks;<br>        PL_mark_id++) { | | |
|         reserved | 8 | bslbf |
|         MarkType | 8 | bslbf |
|         RefToPlayItemID | 16 | uimsbf |
|         MarkTimeStamp | 32 | uimsbf |
|         EntryESPID | 16 | uimsbf |
|         Duration | 32 | uimsbf |
|     } | | |
| } | | |

FIG. 16

| SYNTAX | DATA LENGTH (BITS) | MNEMONICS |
|---|---|---|
| Clip information file { | | |
|     TypeIndicator | 8 * 4 | bslbf |
|     TypeIndicator2 | 8 * 4 | bslbf |
|     SequenceInfoStartAddress | 32 | uimsbf |
|     ProgramInfoStartAddress | 32 | uimsbf |
|     CPIStartAddress | 32 | uimsbf |
|     ClipMarkStartAddress | 32 | uimsbf |
|     ExtensionDataStartAddress | 32 | uimsbf |
|     reserved | 96 | bslbf |
|     blkClipInfo() | | |
|     for (i=0; i<N1; i++) { | | |
|         padding_word | 16 | bslbf |
|     } | | |
|     blkSequenceInfo() | | |
|     for (i=0; i<N2; i++) { | | |
|         padding_word | 16 | bslbf |
|     } | | |
|     blkProgramInfo() | | |
|     for (i=0; i<N3; i++) { | | |
|         padding_word | 16 | bslbf |
|     } | | |
|     blkCPI() | | |
|     for (i=0; i<N4; i++) { | | |
|         padding_word | 16 | bslbf |
|     } | | |
|     blkClipMark() | | |
|     for (i=0; i<N5; i++) { | | |
|         padding_word | 16 | bslbf |
|     } | | |
|     blkExtensionData() | | |
|     for (i=0; i<N6; i++) { | | |
|         padding_word | 16 | bslbf |
|     } | | |
| } | | |

FIG. 17

| SYNTAX | DATA LENGTH (BITS) | MNEMONICS |
|---|---|---|
| blkClipInfo() { | | |
|     Length | 32 | uimsbf |
|     reserved | 16 | bslbf |
|     ClipStreamType | 8 | bslbf |
|     ApplicationType | 8 | bslbf |
|     reserved | 31 | bslbf |
|     IsCC5 | 1 | bslbf |
|     TSRecordingRate | 32 | uimsbf |
|     NumberOfSourcePackets | 32 | uimsbf |
|     reserved | 1024 | bslbf |
|     TSTypeInfoBlock() | | |
|     if (IsCC5 ==1$_b$) { | | |
|         reserved | 8 | bslbf |
|         FollowingClipStreamType | 8 | bslbf |
|         reserved | 32 | bslbf |
|         FollowingClipInformationFileName | 8 * 5 | bslbf |
|         ClipCodecIdentifier | 8 * 4 | bslbf |
|         reserved | 8 | bslbf |
|     } | | |
| } | | |

FIG. 18

| SYNTAX | DATA LENGTH (BITS) | MNEMONICS |
|---|---|---|
| blkCPI() { | | |
|     Length | 32 | uimsbf |
|     if(Length !=0) { | | |
|         reserved | 12 | bslbf |
|         CPIType | 4 | bslbf |
|         blkEPMap() | | |
|     } | | |
| } | | |

FIG. 19

| SYNTAX | DATA LENGTH (BITS) | MNEMONICS |
|---|---|---|
| blkEPMap(){ | | |
|   reserved | 8 | bslbf |
|   NumberOfStreamPIDEntries | 8 | uimsbf |
|   for (k=0; k<NumberOfStreamPIDEntries; k++) { | | |
|     StreamPID[k] | 16 | bslbf |
|     reserved | 10 | bslbf |
|     EPStreamType[k] | 4 | bslbf |
|     NumberOfEPCoarseEntries[k] | 16 | uimsbf |
|     NumberOfEPFineEntries[k] | 18 | uimsbf |
|     EPMapForOneStreamPIDStartAddress[k] | 32 | uimsbf |
|   } | | |
|   for (i=0; i<X; i++) { | | |
|     padding_word | 16 | bslbf |
|   } | | |
|   for (k=0; k<NumberOfStreamPIDEntries; k++) { | | |
|     blkEPMapForOneStreamPID(EPStreamType[k], NumberOfEPCoarseEntries[k], NumberOfEPFineEntries[k]) | | |
|     for (i=0; i<Y[k]; i++) { | | |
|       padding_word | 16 | bslbf |
|     } | | |
|   } | | |
| } | | |

FIG. 20

| SYNTAX | DATA LENGTH (BITS) | MNEMONICS |
|---|---|---|
| blkEPMapForOneStreamPID(*EP_stream_type, Nc, Nf*) { | | |
|     EPFineTableStartAddress | 32 | uimsbf |
|     for (i=0; i<*Nc*; i++) { | | |
|     // EP coarse table | | |
|         RefToEPFineID*[i]* | 18 | uimsbf |
|         PTSEPCoarse*[i]* | 14 | uimsbf |
|         SPNEPCoarse*[i]* | 32 | uimsbf |
|     } | | |
|     for (i=0; i<X; i++) { | | |
|         padding_word | 16 | bslbf |
|     } | | |
|     for (*EP_fine_id* =0; *EP_fine_id* < *Nf*; *EP_fine_id*++) { | | |
|     // EP fine table | | |
|         ReservedEPFine*[EP_fine_id]* | 1 | bslbf |
|         IEndPositionOffset*[EP_fine_id]* | 3 | bslbf |
|         PTSEPFine*[EP_fine_id]* | 11 | uimsbf |
|         SPNEPFine*[EP_fine_id]* | 17 | uimsbf |
|     } | | |
| } | | |

· PTS         :b0 through b32 (33-bit, 90kHz)
· PTSEPFine   :b9 through b19 (11-bit, Resolution=5.7msec and Wrap around in 11.5 seconds approximately)
· PTSEPCoarse :b19 through b32 (14-bit, Resolution=5.8 sec and Wrap around in 26.5 hours approximately)

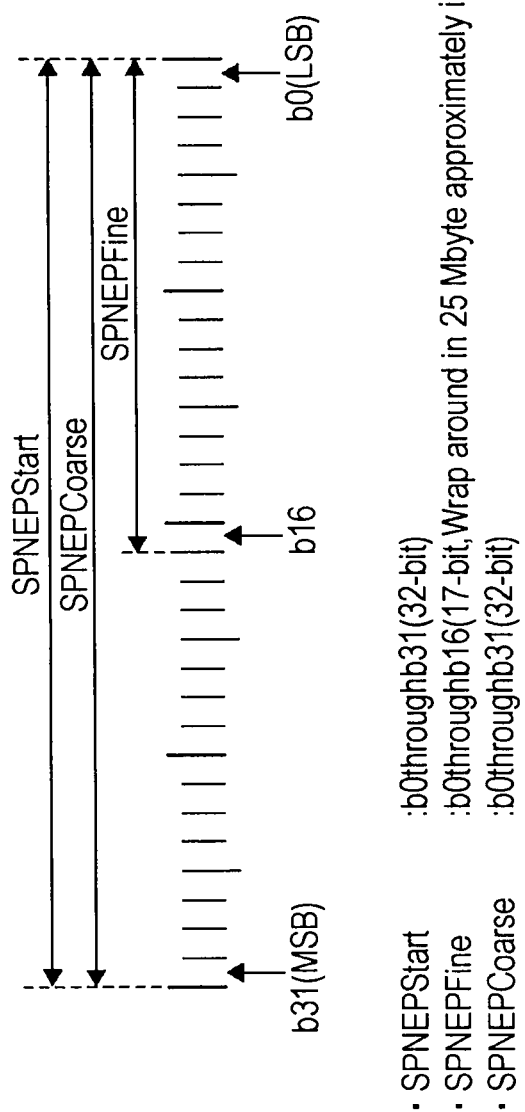

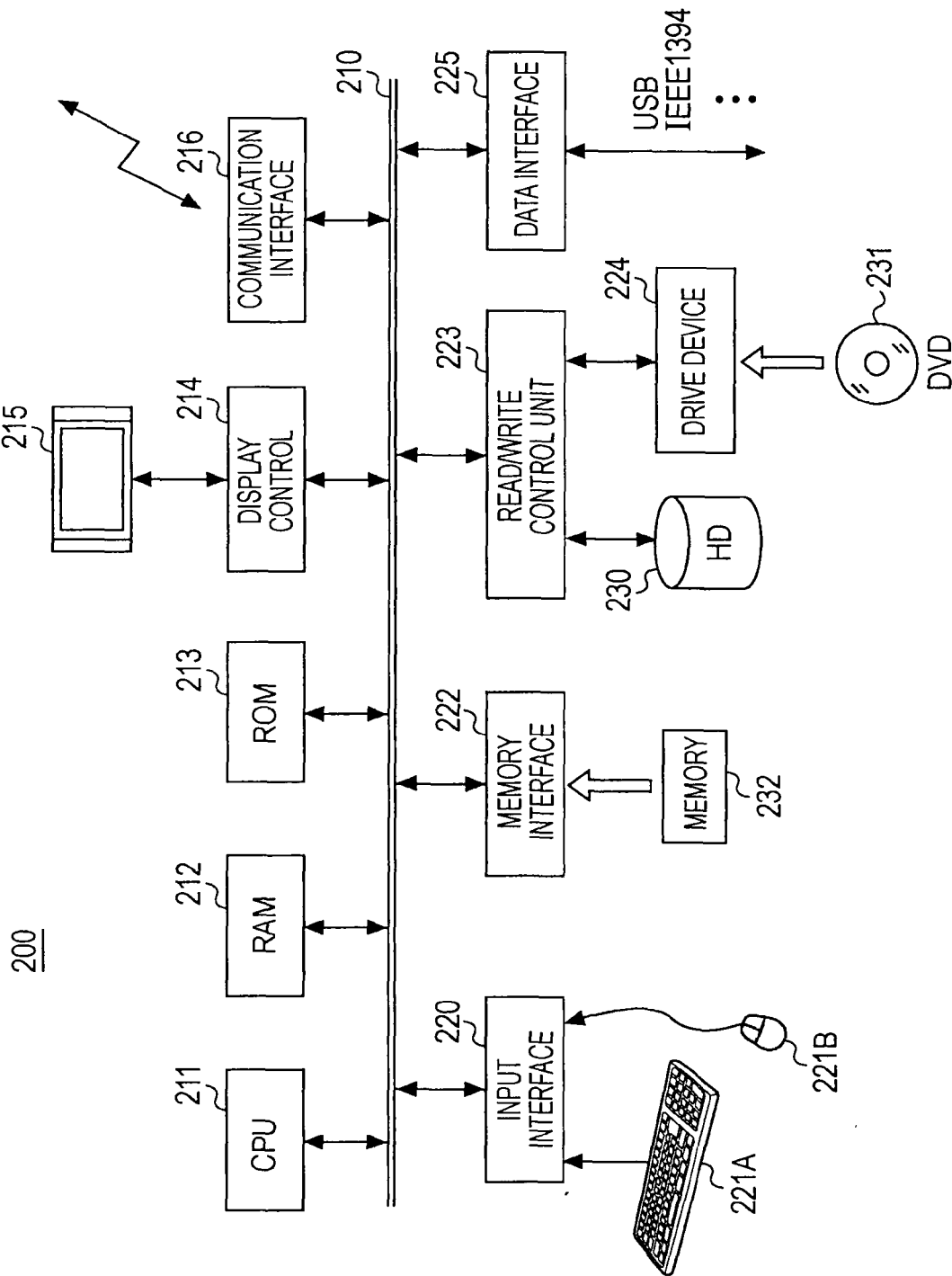

EDITING DEVICE, EDITING METHOD AND EDITING PROGRAM, AND DATA PROCESSING DEVICE, DATA PROCESSING METHOD AND DATA PROCESSING PROGRAM

CROSS REFERENCES TO RELATED APPLICATIONS

The present invention contains subject matter related to Japanese Patent Application JP 2007-144458 filed in the Japanese Patent Office on May 31, 2007, the entire contents of which are incorporated herein by reference.

BACKGROUND OF THE INVENTION

1. Field of the Invention

The present invention relates to an editing device, editing method and editing program, and a data processing device, data processing method and data processing program, which are suitable for dubbing stream data recorded in a recording medium to another recording medium.

2. Description of the Related Art

In recent years, with video cameras and the like for example, there have appeared products which employ recordable type DVD (Digital Versatile Disc) instead of a conventional magnetic tape as a recording medium employed for a recording device which converts a picture signal imaged with an imaging device into digital video data, and compression-encodes and records this. As for recordable type DVD, in addition to a standard type having recording capacity of 4.7 GB (gigabytes) or more at 12 cm in diameter, a type having recording capacity of 1.4 GB or so (single layer) at 8 cm in diameter has been frequently employed. In particular, the type of 8 cm in diameter has been frequently employed for a device of which reduction in size is required, such as a portable video camera and the like, as an example.

With this recordable type DVD, UDF (Universal Disk Format) is employed as a file system, which a UDF-compatible computer can access. UDF includes the format according to ISO (International Organization for Standardization) 9660, which can be accessed with various file systems employed for a computer. Video data and audio data are recorded as to this recordable type DVD as a file, thereby increasing compatibility with other devices such as computers and the like, and accordingly, recorded data can be utilized effectively.

Further, in recent years, there has appeared a device wherein a hard disk drive having recording capacity of several tens of GB or more is built in a video camera, and video data and audio data obtained by shooting are recorded in the hard disk drive as a file. Further, there has appeared a device wherein both a type of recording medium embedded in a casing, and a detachable type recording medium such as described above, can be employed. This device capable of employing both of a built-in type recording medium and a detachable type recording medium will be referred to as a "hybrid type device" below.

With Japanese Unexamined Patent Application Publication No. 2006-344321, a hybrid type recording device configured to employ DVD and a built-in hard disk as recording media is described.

With such a hybrid type recording/playback device capable of employing a recording medium embedded in a casing, and a detachable recording medium, for example, a use method can be conceived wherein a built-in recording medium is subjected to recording of input video data or the like, and the video data recorded in the built-in recording medium is dubbed to a detachable recording medium to be removed externally.

SUMMARY OF THE INVENTION

Now, let us consider a case wherein two pieces of video data recorded in a recording medium are played consecutively at frame timing. As an example, let us consider a case wherein when recording is interrupted temporarily at the time of shooting with a video camera, and recording is resumed, whereby the file is divided into two files at the position where recording has been interrupted. These two files should be able to be played consecutively at frame timing. Also, a case can also be considered wherein the two files are consecutively played at frame timing by editing.

Note that performing playback control between two pieces of video data so as to be played consecutively at frame timing will be referred to as "seamless connection". In order to perform seamless connection, there is a need to satisfy a buffer model of a decoder at the time of decoding at least the frames immediately before and immediately after the connection position.

In such a case, there is a need to generate and hold information indicating that first and second files to be processed are connected seamlessly. Based on the information thereof, the decoder performs playback control such that the first and second files are played seamlessly. With the recording/playback device which has performed recording of the first and second files, the seamless connection between the first and second files can be performed by employing the management information unique to the device, for example.

Next, let us consider a case wherein the first and second files to be connected seamlessly are dubbed to another recording medium, e.g., a detachable recording medium, such as recordable type DVD, for example. The detachable recording medium in which the first and second files are recorded is played by another playback device, for example. In this case, there is a need to record the management information indicating that the first and second files are connected seamlessly in the detachable recording medium.

Note however, with conventional arrangements, there has been a problem in that management information for managing seamless connection is not recorded in a dubbing destination recording medium.

Also, there has been a problem in that even if the management information is recorded in a dubbing destination recording medium, when a playback device for playing the dubbing destination recording medium cannot handle the management information, seamless playback of the first and second files cannot be realized.

On the other hand, there is a case wherein marks indicating the breaks of a playback position are set to video data to be stored in the file recorded in the built-in recording medium. The marks are automatically set based on a predetermined condition at the time of recording, or set with editing processing by a user. Let us refer to between the marks as a "chapter". A playback position can be specified in increments of chapters at the time of playback, and specifying of a dubbing position in increments of chapters at the time of dubbing is conceivable, as well as specifying such that seamless connection is performed with editing or the like between chapters which are originally not continued in time, for example.

Thus, there has been demand for a function for automatically determining whether or not seamless connection is to be performed at the time of playback in a case wherein dubbing is to be performed in increments of chapters at the time of creating management information for managing seamless connection, and performing settings accordingly.

Accordingly, there has been recognized a need to provide an editing device, editing method and editing program, and data processing device, data processing method and data processing program, which allow a dubbing destination to perform seamless connection regarding video data to be connected seamlessly at the time of dubbing a plurality of video data recorded in a recording medium to another recording medium.

According to an embodiment of the present invention, an editing device configured to dub stream data stored in a second recording medium to a first recording medium, includes: a recording unit configured to record data in the first recording medium; a recording control unit configured to control the recording unit to record the specified range of later-described stream data stored in a later-described stream file in the first recording medium as a stream file, based on the management information recorded in the second recording medium wherein at least a stream information file in which a stream file storing stream data made up of a predetermined size of packet is recorded, and stream information whereby the playback point-in-time information and address information of the stream data are correlated is stored, and a playback list file in which one or more playback section data specifying a playback section is stored by setting a playback start point and playback end point as to the stream data, and mark information indicating the playback point-in-time information as to the stream data can be stored, are recorded as the management information of the stream data; and a management information generating unit configured to generate the management information as to the stream file recorded in the first recording medium by the recording control unit; wherein the management information generating unit is configured to generate management information as to the stream file to be recorded in the first recording medium based on the relation between the specified range as to the stream file recorded in the second recording medium, and the playback section data and the stream information corresponding to the specified range.

According to an embodiment of the present invention, an editing method configured to dub stream data stored in a second recording medium to a first recording medium, includes the steps of: recording data in the first recording medium; controlling the recording step to record the specified range of later-described stream data stored in a later-described stream file in the first recording medium as a stream file, based on the management information recorded in the second recording medium wherein at least a stream information file in which a stream file storing stream data made up of a predetermined size of packet is recorded, and stream information whereby the playback point-in-time information and address information of the stream data are correlated is stored, and a playback list file in which one or more playback section data specifying a playback section is stored by setting a playback start point and playback end point as to the stream data, and mark information indicating the playback point-in-time information as to the stream data can be stored, are recorded as the management information of the stream data; and generating the management information as to the stream file recorded in the first recording medium by the controlling step; wherein the generating step is configured to generate management information as to the stream file to be recorded in the first recording medium based on the relation between the specified range as to the stream file recorded in the second recording medium, and the playback section data and the stream information corresponding to the specified range.

According to an embodiment of the present invention, with an editing program causing a computer to execute an editing method configured to dub stream data stored in a second recording medium to a first recording medium, the editing method includes the steps of: recording data in the first recording medium; controlling the recording step to record the specified range of later-described stream data stored in a later-described stream file in the first recording medium as a stream file, based on the management information recorded in the second recording medium wherein at least a stream information file in which a stream file storing stream data made up of a predetermined size of packet is recorded, and stream information whereby the playback point-in-time information and address information of the stream data are correlated is stored, and a playback list file in which one or more playback section data specifying a playback section is stored by setting a playback start point and playback end point as to the stream data, and mark information indicating the playback point-in-time information as to the stream data can be stored, are recorded as the management information of the stream data; and generating the management information as to the stream file recorded in the first recording medium by the controlling step; wherein the generating step is configured to generate management information as to the stream file to be recorded in the first recording medium based on the relation between the specified range as to the stream file recorded in the second recording medium, and the playback section data and the stream information corresponding to the specified range.

With the configuration described above, control is performed so as to record the specified range of later-described stream data stored in a later-described stream file in the first recording medium as a stream file, based on the management information recorded in the second recording medium wherein at least a stream information file in which a stream file storing stream data made up of a predetermined size of packet is recorded, and stream information whereby the playback point-in-time information and address information of the stream data are correlated is stored, and a playback list file in which one or more playback section data specifying a playback start point and playback end point as to the stream data, and mark information indicating the playback point-in-time information as to the stream data can be stored, are recorded as the management information of the stream data, and management information as to the stream file to be recorded in the first recording medium is generated based on the relation between the specified range as to the stream file recorded in the second recording medium, and the playback section data and the stream information corresponding to the specified range, whereby the stream data stored in the stream file recorded in the second recording medium can be dubbed to the first recording medium in increments of specified ranges, and the stream data dubbed to the first recording medium can be playback-controlled based on the management information.

According to an embodiment of the present invention, a data processing device includes: a recording control unit configured to perform recording control regarding the stream file recorded in a first recording medium and first management information of the stream file so as to record the specified range of stream data stored in the stream file as to a second recording medium as a stream file; and a management information generating unit configured to generate second management information as to the stream file recorded in the second recording medium by the recording control unit based on the relation between the specified range corresponding to the stream file recorded in the first recording medium, and the first management information.

According to an embodiment of the present invention, a data processing method includes the steps of: performing recording control regarding the stream file recorded in a first recording medium and first management information of the stream file so as to record the specified range of stream data stored in the stream file as to a second recording medium as a stream file; and generating second management information as to the stream file recorded in the second recording medium by the recording control unit based on the relation between the specified range corresponding to the stream file recorded in the first recording medium, and the first management information.

According to an embodiment of the present invention, a data processing program causing a computer to execute a data processing method includes the steps of: performing recording control regarding the stream file recorded in a first recording medium and first management information of the stream file so as to record the specified range of stream data stored in the stream file as to a second recording medium as a stream file; and generating second management information as to the stream file recorded in the second recording medium by the recording control unit based on the relation between the specified range corresponding to the stream file recorded in the first recording medium, and the first management information.

With the configuration described above, recording control is performed regarding the stream file recorded in a first recording medium and first management information of the stream file so as to record the specified range of stream data stored in the stream file as to a second recording medium as a stream file, and second management information as to the stream file recorded in the second recording medium is generated based on the relation between the specified range corresponding to the stream file recorded in the first recording medium, and the first management information, whereby the stream data stored in the stream file recorded in the first recording medium can be dubbed to the second recording medium in increments of specified ranges, and the stream data dubbed to the second recording medium can be playback-controlled based on the second management information.

That is to say, according to a configuration made based on embodiments of the present invention, control is performed so as to record the specified range of later-described stream data stored in a later-described stream file in the first recording medium as a stream file, based on the management information recorded in the second recording medium wherein at least a stream information file in which a stream file storing stream data made up of a predetermined size of packet is recorded, and stream information whereby the playback point-in-time information and address information of the stream data are correlated is stored, and a playback list file in which one or more playback section data specifying a playback section is stored by setting a playback start point and playback end point as to the stream data, and mark information indicating the playback point-in-time information as to the stream data can be stored, are recorded as the management information of the stream data, and management information as to the stream file to be recorded in the first recording medium is generated based on the relation between the specified range as to the stream file recorded in the second recording medium, and the playback section data and the stream information corresponding to the specified range, thereby providing an advantage wherein the stream data stored in the stream file recorded in the second recording medium can be dubbed to the first recording medium in increments of specified ranges, and the stream data dubbed to the first recording medium can be playback-controlled based on the management information.

Also, according to another configuration made based on embodiments of the present invention, recording control is performed regarding the stream file recorded in a first recording medium and first management information of the stream file so as to record the specified range of stream data stored in the stream file as to a second recording medium as a stream file, and second management information as to the stream file recorded in the second recording medium is generated based on the relation between the specified range corresponding to the stream file recorded in the first recording medium, and the first management information, thereby providing an advantage wherein the stream data stored in the stream file recorded in the first recording medium can be dubbed to the second recording medium in increments of specified ranges, and the stream data dubbed to the second recording medium can be playback-controlled based on the second management information.

BRIEF DESCRIPTION OF THE DRAWINGS

FIG. 7 is a schematic diagram illustrating a syntax representing a structure example of a file "index.bdmv";

FIG. 8 is a schematic diagram illustrating a syntax representing a structure example of a block blkIndexes( );

FIG. 9 is a schematic diagram illustrating a syntax representing a structure example of a file "MovieObject.bdmv";

FIG. 10 is a schematic diagram illustrating a syntax representing a structure example of a block blkMovieObjects( );

FIG. 11 is a schematic diagram illustrating a syntax representing a structure example of a playlist file "xxxxx.mpls";

FIG. 12 is a schematic diagram illustrating a syntax representing a structure example of a block blkPlayList( );

FIG. 13 is a schematic diagram illustrating a syntax representing a structure example of a block blkPlayItem( );

FIG. 15 is a schematic diagram illustrating a syntax representing a structure example of a block blkPlayListMark( );

FIG. 16 is a schematic diagram illustrating a syntax representing a structure example of a clip information file;

FIG. 17 is a schematic diagram illustrating a syntax representing a structure example of a block blkClipInfo( );

FIG. 18 is a schematic diagram illustrating a syntax representing a structure example of a block blkCPI( );

FIG. 19 is a schematic diagram illustrating a syntax representing a structure example of a block blkEPMap( );

FIG. 20 is a schematic diagram illustrating a syntax representing a structure example of a block blkEPMapForOneStreamPID(EP_stream_type, Nc, Nf);

FIG. 22 is a schematic diagram illustrating a format example of an entry SPNEPCoarse and entry SPNEPFine;

FIG. 35 is a block diagram illustrating a configuration example of a common computer.

DESCRIPTION OF THE PREFERRED EMBODIMENTS

Description will be made below regarding embodiments of the present invention in accordance with the following sequence.
1. Format Example Applicable to Present Invention
 1-1. Data Model
 1-2. File Management Structure
  1-2-1. File Management Structure Applicable to Recording Medium Other Than Optical Disc
 1-3. Respective File Configurations
  1-3-1. Extended Data Structure
  1-3-2. Specific Example of Extended Data
 1-4. Virtual Player
2. Recording Device Applicable to Present Invention
3. Data Structure Applicable to Present Invention
4. First Embodiment of Present Invention
 4-1. Dubbing Processing According to First Embodiment
  4-1-1. Specific Example of Dubbing Processing
  4-1-2. Creation of Play Item and Clip Information of Dubbing destination
  4-1-3. Determination Processing Example of Seamless Information
 4-2. Supplement
5. Modification of First Embodiment of Present Invention
6. Second Embodiment of Present Invention
 6-1. Configuration Example of Device Applicable to Second Embodiment
 6-2. Dubbing Processing Example According to Second Embodiment 1. Format Example Applicable to Present Invention First, in order to facilitate understanding, description will be made regarding a format configuration (hereafter, referred to as "AVCHD format") applicable to the present invention. The AVCHD format is a format being presented as a recording format wherein an AV (Audio/Video) stream obtained by multiplexing video data and audio data in a predetermined manner is recorded in a recordable recording medium, whereby the AV stream recorded in the recording medium can be managed with a playlist in increments of clips.

For example, a bit stream encoded with an encoding method stipulated in ITU-T (International Telecommunication Union-Telecommunication Standardization Sector) recommendation H.264, or ISO (International Organization for Standardization)/IEC (International Electrotechnical Commission) International Standards 14496-10 (MPEG-4 Part 10) Advanced Video Coding (hereafter, abbreviated to H.264|AVC), or an encoding method such as MPEG (Moving Pictures Experts Group) video or MPEG audio, and multiplexed in accordance with MPEG2 is referred to as a "clip AV stream" (or AV stream). A clip AV stream is recorded in a disk as a file by a predetermined file system. This file is referred to as a "clip AV stream file" (or AV stream file).

A clip AV stream file is a management increment in the file system, which is not necessarily restricted to a management increment recognizable by a user. In the case of considering convenience of a user, there is a need to record an arrangement wherein multiple clip AV stream files into which a picture content is divided are collectively played, an arrangement wherein only a part of a clip AV stream file is played, and further, information for performing special playback or cue playback smoothly, and so forth in a disk as a database.

1-1. Data Model

Figure 1:
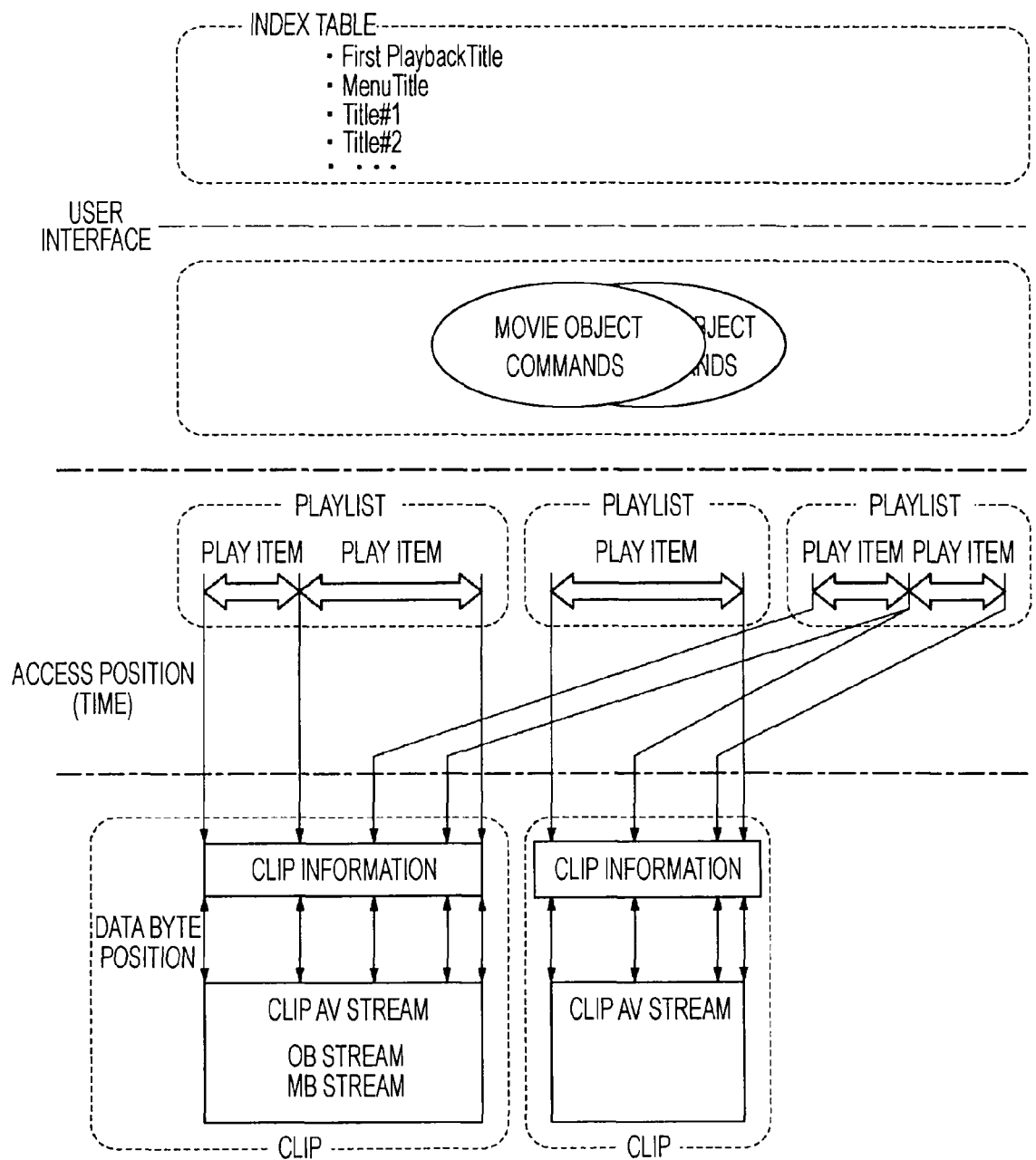
FIG. 1 is a schematic diagram schematically illustrating a data model stipulated in the AVCHD format applicable to the present invention.

FIG. 1 schematically illustrates a data model stipulated in the AVCHD format applicable to the present invention. According to the AVCHD format, the data structure is made up of four layers, as shown in FIG. 1. The lowermost layer is a layer where a clip AV stream is disposed (referred to as "clip layer" for convenience). The layer above thereof is a layer where there are disposed a playlist and a play item for specifying a playback position as to the clip AV stream (referred to as "playlist layer" for convenience). The layer further above thereof is a layer where a movie object (Movie Object) made up of a command for specifying playback sequence as to a playlist and so forth are disposed (referred to as "object layer" for convenience). The uppermost layer is a layer where an index table for managing a title and so forth to be stored in a recording medium is disposed (referred to as "index layer" for convenience).

Description will be made regarding a clip layer. A clip AV stream is a bit stream wherein video data and audio data are multiplexed in a MPEG2 TS (transport stream) format or the like. Information relating to an AV stream is recorded in a file as clip information (Clip Information).

Also, an AV stream can be multiplexed with an OB (Overlay Bitmap) stream which is a graphic stream for displaying a caption, or an MB (Menu Bitmap) stream into which data employed for menu display and the like (button image data and the like) is converted.

A clip AV stream file, and a clip information file in which the corresponding clip information is recorded are regarded as a batch of objects, and referred to as a "clip". That is to say, a clip is one object made up of a clip AV stream and clip information.

A file is generally handled as a byte sequence. The content of a clip AV stream file is decompressed on the time axis, and an entry point within a clip is specified principally temporally. In a case wherein the timestamp of an access point to a predetermined clip is given, in order to find address information wherein readout of data is to be started within a clip AV stream file, clip information can be employed.

Description will be made regarding the playlist layer. A playlist layer is configured of specification of an AV stream file to be played, and a group of a playback start point (IN point) and playback end point (OUT point) for specifying the playback position of the specified AV stream file. A set of the information of a playback start point and playback end point is referred to as a "play item". A playlist is made up of a group of play items. Playing a play item means playing a part of an AV stream file referenced with the play item thereof. That is to say, based on the IN point and OUT point information within a play item, the corresponding section within a clip is played.

Description will be made regarding the object layer. A movie object includes terminal information liking a navigation command program with the movie object thereof. A navigation program is a command for controlling playback of a playlist (navigation command). Terminal information includes information for allowing interactive operations as to a user's player. Based on this terminal information, user's operations such as calling up of a menu screen, and searching of a title are controlled.

Description will be made regarding the index layer. An index layer is made up of an index table (Index Table). The index table is a top-level table wherein the title of a content recorded in a recording medium is defined. Based on the title information stored in the index table, playback of a recording medium is controlled by a module manager within the system software which resides in the player constantly.

Figure 2:
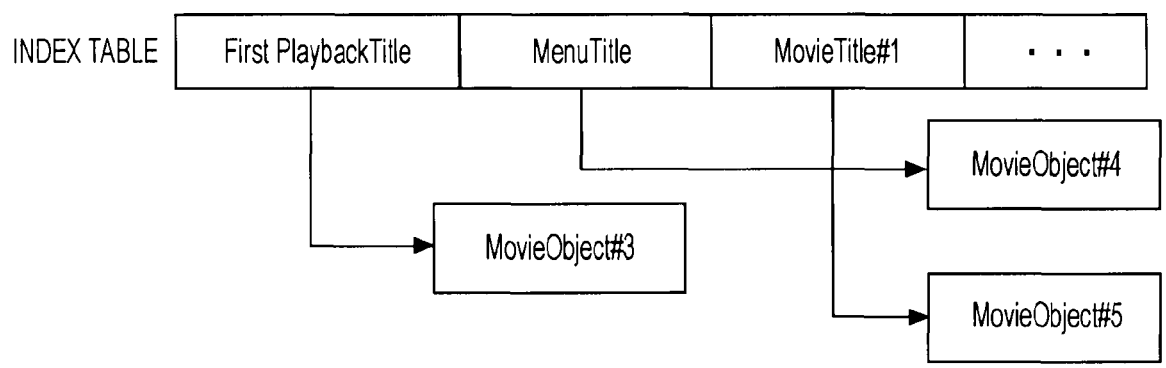
FIG. 2 is a schematic diagram for describing an index table.

That is to say, as schematically shown in FIG. 2, an arbitrary entry within the index table is referred to as a "title", a first playback title (First PlaybackTitle), a menu title (Menu-Title), and movie titles (MovieTitle) #1, #2, and so on which enter the index table are all titles. Each of the titles indicates a link to a movie object.

Taking a recording medium only for playback as an example to facilitate understanding, for example, if a content stored in the recording medium thereof is a movie, a First PlaybackTitle corresponds to a promotional picture (trailer) of a movie company which is projected in advance of a film main part. In a case wherein a content is a movie for example, a menu title corresponds to a menu screen for selecting playback of a film main portion, chapter search, caption and language settings, privilege picture playback, or the like. Also, a movie title is each picture selected from the menu title. An arrangement may be made wherein the title is a menu screen.

Figure 3:
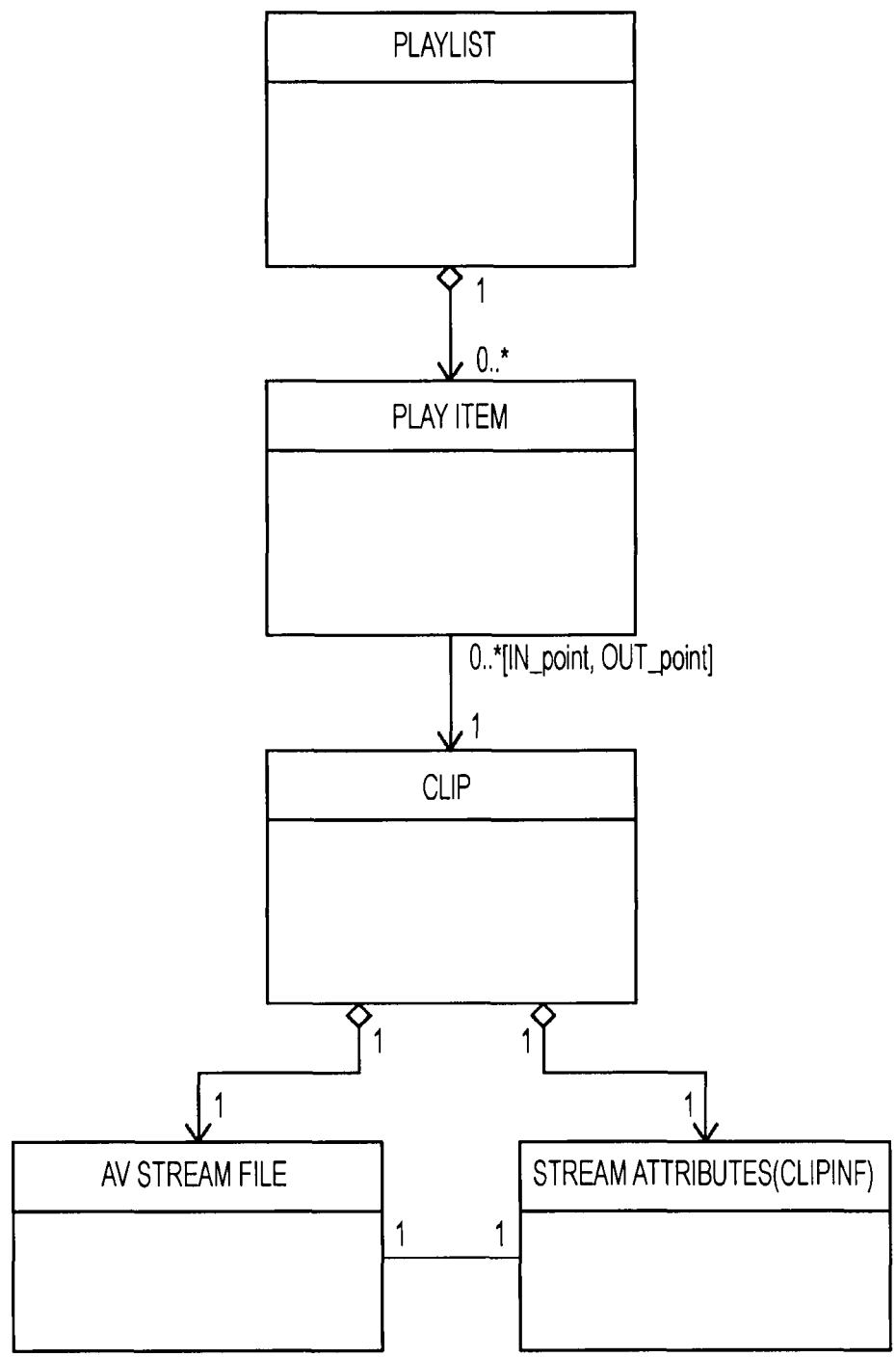
FIG. 3 is a UML diagram illustrating the relation between a clip AV stream, clip information, clip, play item, and playlist.

FIG. 3 is a UML (Unified Modeling Language) diagram illustrating the relation between a clip AV stream, clip information (Stream Attributes), clip, play item, and playlist. A playlist is correlated to a single or multiple play items, and a play item is correlated to a single clip. Multiple play items having a different start point and/or end point can be correlated to a single clip. A single clip AV stream file is referenced from a single clip. Similarly, a single clip information file is referenced from a single clip. Also, a clip AV stream file and a clip information file have one-on-one correspondence relationship. Such a structure is defined, whereby non-destructive playback order specification can be performed wherein only an arbitrary portion is played without changing a clip AV stream file.

Figure 4:
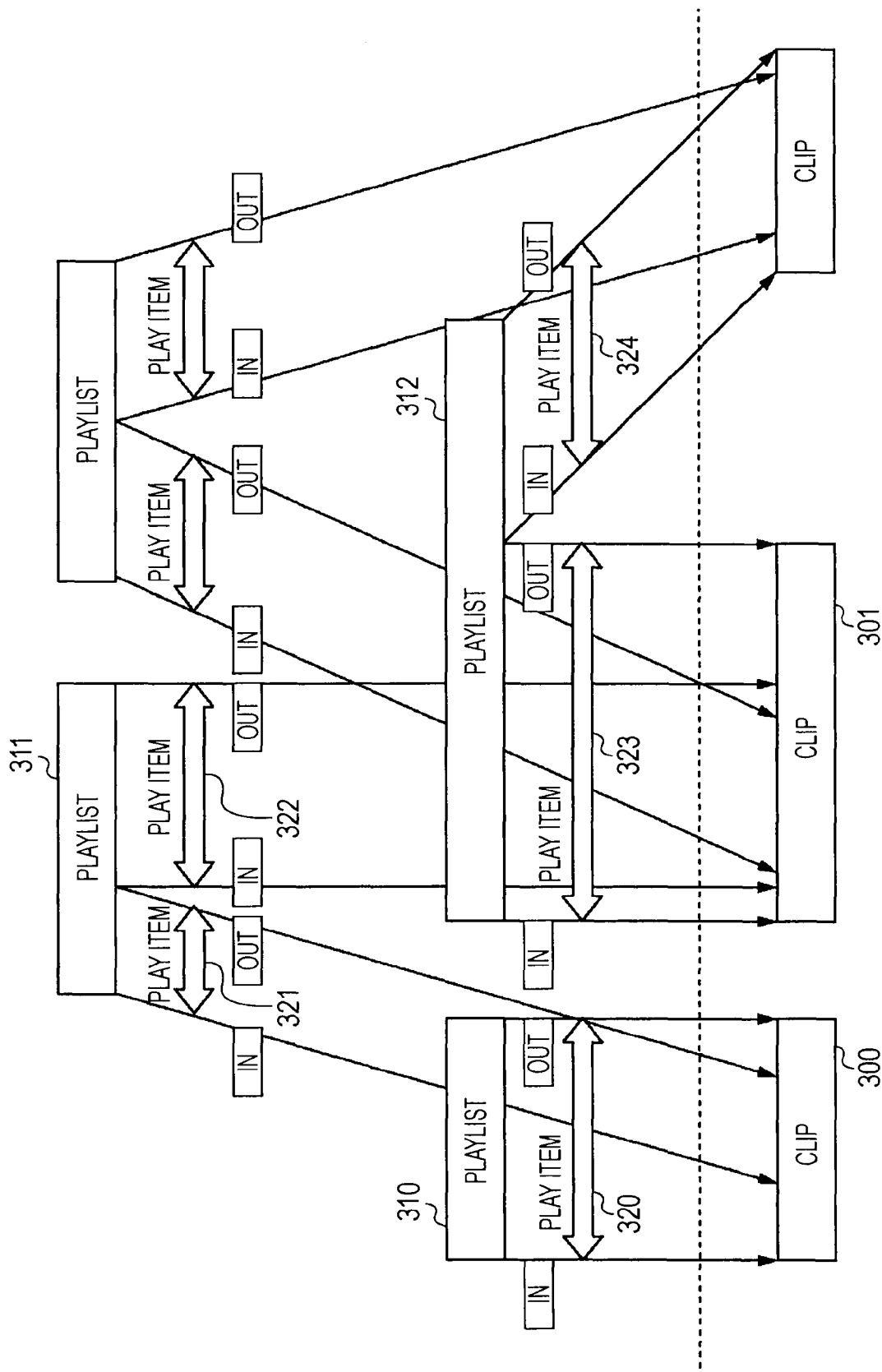
FIG. 4 is a schematic diagram for describing a method for referencing the same clip from multiple playlists.

Also, as shown in FIG. 4, the same clip can also be referenced from multiple PlayLists. Also, multiple clips can also be specified from a single playlist. A clip is referenced with an IN point and OUT point shown in a play item within a playlist. With the example in FIG. 4, a clip 300 is referenced from a play item 320 of a playlist 310, and also of play items 321 and 322 making up a playlist 311, a section indicated with an IN point and OUT point is referenced from the play item 321. Also, with a clip 301, a section indicated with an IN point and OUT point is referenced from the play item 322 of the playlist 311, and also of play items 323 and 324 of a playlist 312, a section indicated with an IN point and OUT point of the play item 323 is referenced.

1-2. File Management Structure

Figure 5:
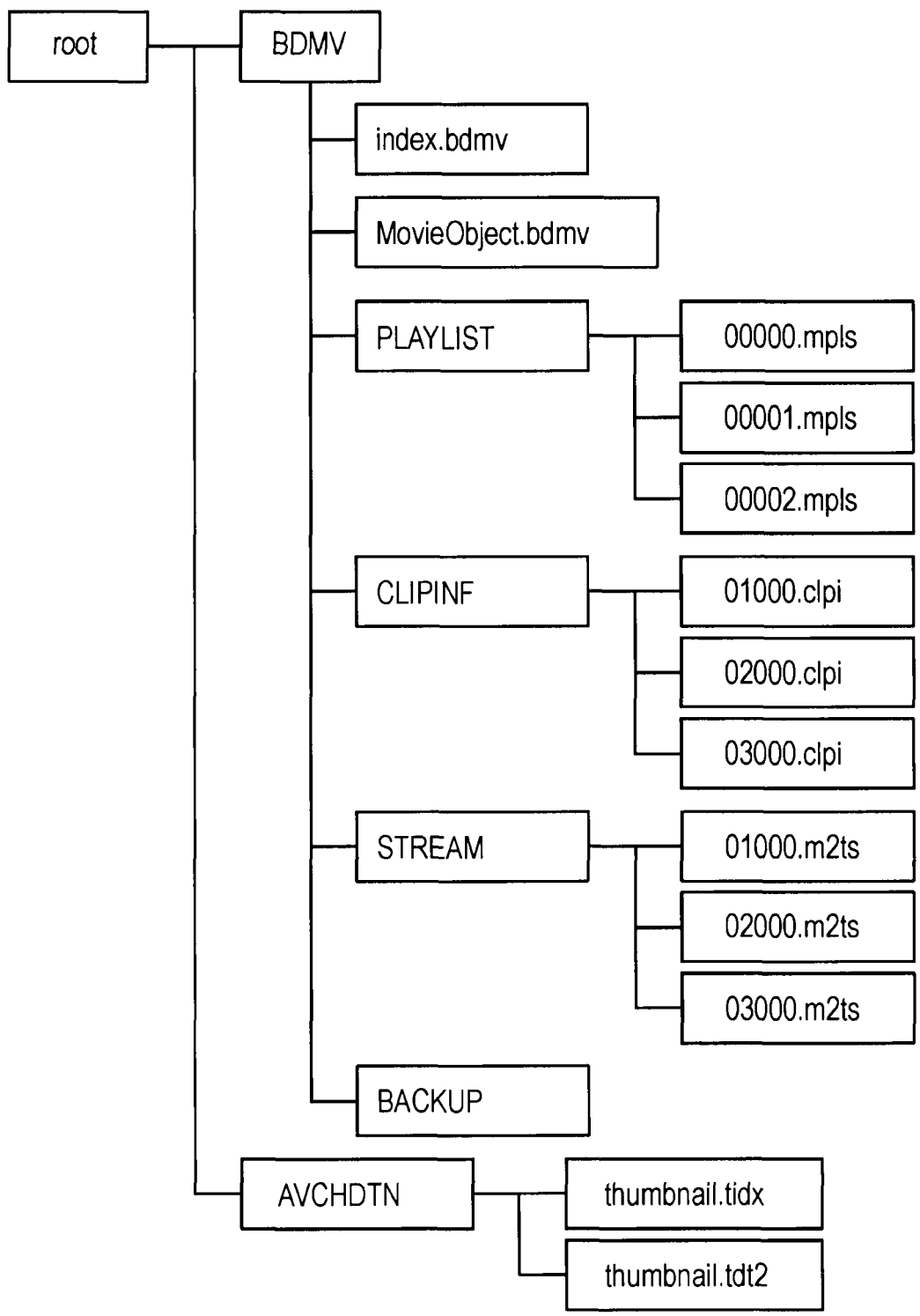
FIG. 5 is a schematic diagram for describing the management structure of a file to be recorded in a recording medium.

Next, description will be made regarding the management structure of files to be recorded in a recording medium with reference to FIG. 5. The management structure shown in FIG. 5 is suitably employed at the time of applying an optical disc such as recordable type DVD as a recording medium. Files are hierarchically managed with a directory structure. First, one directory (root directory in the example in FIG. 5) is created on a recording medium. Let us say that under this directory is a range to be managed with one recording playback system.

A directory "BDMV" and directory "AVCHDTN" are disposed under the root directory. Thumbnail files wherein the representative images of a clip are reduced to a predetermined size are disposed under the directory "AVCHDTN". The data structure described with reference to FIG. 1 is stored in the directory "BDMV".

Only two files of a file "index.bdmv" and file "MovieObject.bdmv" can be disposed immediately under the directory "BDMV". Also, a directory "PLAYLIST", directory "CLIPINF", directory "STREAM", and directory "BACKUP" are disposed under the directory "BDMV". The backups of the respective directories and files are stored in the directory "BACKUP".

The file "index.bdmv" describes the content of the directory "BDMV". That is to say, this file "index.bdmv" corresponds to the index table in the index layer which is the uppermost layer described above. Also, the file "MovieObject.bdmv" stores the information of one movie object or more. That is to say, this file "MovieObject.bdmv" corresponds to the above-mentioned object layer.

The directory "PLAYLIST" is a directory where the database of PlayLists is disposed. That is to say, the directory "PLAYLIST" includes a file "xxxxx.mpls" which is a file relating to a playlist. A file "xxxxx.mpls" is a file as to each of PlayLists. With the file name thereof, the "xxxxx" before the period "." is a five-digit numeral, and the "mpls" after the period is an extension which is fixed to this type of file.

The directory "CLIPINF" is a directory where the database of clips is disposed. That is to say, the directory "CLIPINF" includes a file "zzzzz.clpi" which is a clip information file corresponding to each of clip AV stream files. With the file name thereof, the "zzzzz" before the period "." is a five-digit numeral, and the "clpi" after the period is an extension which is fixed to this type of file.

The directory "STREAM" is a directory where AV stream files serving as entities are disposed. That is to say, the directory "STREAM" includes a clip AV stream file corresponding to each of clip information files. A clip AV stream file is made up of a transport stream (hereafter, generally referred to as "MPEG2 TS") of MPEG2 (Moving Pictures Experts Group 2), and has a file name "zzzzz.m2ts". With the file name thereof, the "zzzzz" before the period "." is set to the same as its corresponding clip information file, whereby the correspondence relation between the clip information file and this clip AV stream file can be readily recognized.

Note that with the directory "AVCHDTN", two types of a thumbnail file "thumbnail.tidx" and "thumbnail.tdt2" can be disposed. The thumbnail file "thumbnail.tidx" stores thumbnail images encrypted with a predetermined method. The thumbnail file "thumbnail.tdt2" stores thumbnail images not encrypted. For example, the thumbnail image corresponding to a clip shot with a video camera by a user is copy-free, so it can be conceived that there is no need to encrypt this thumbnail image, and accordingly, this thumbnail image is stored in the thumbnail file "thumbnail.tdt2".

Figure 6:
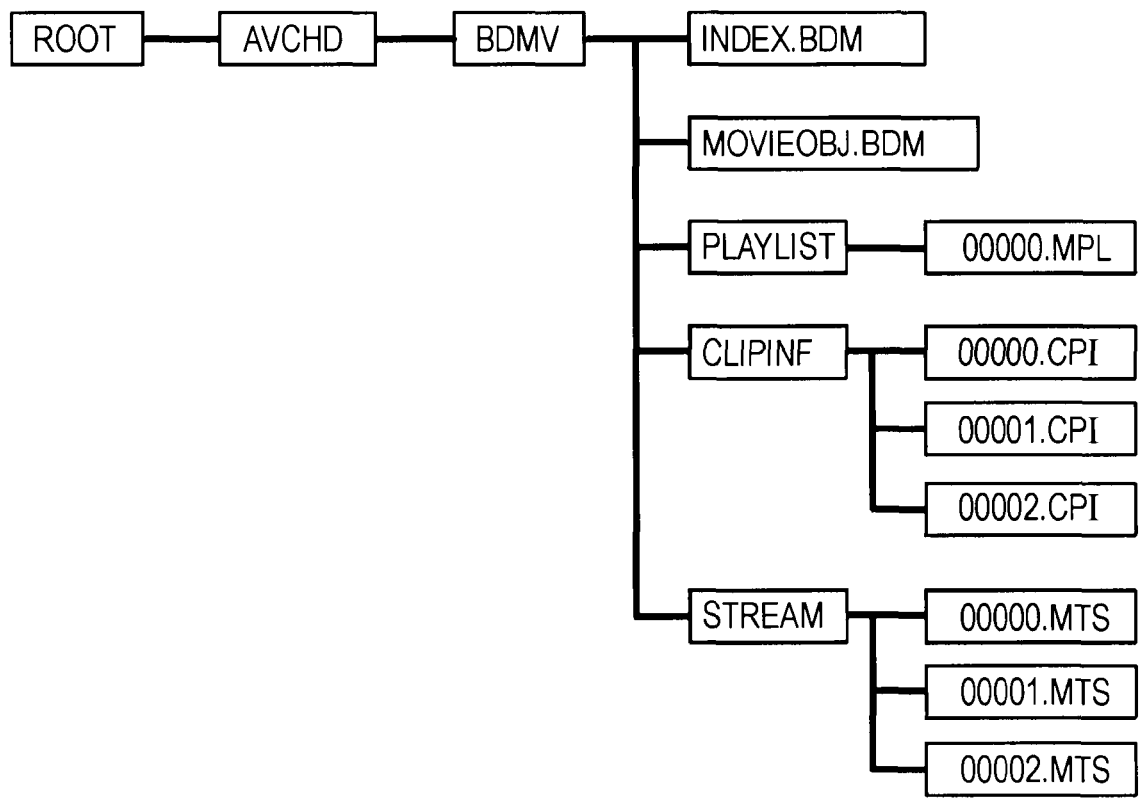
FIG. 6 is a schematic diagram illustrating a management structure example applicable to a recording medium other than an optical disc.

1-2-1. File Management Structure Applicable to Recording Medium Other Than Optical Disc Note that in the case of recording a stream data file in a recording medium other than optical discs (e.g., a hard disk or flash memory embedded in the recording device, flash memory detachable to the recording device, etc.), a management structure that is somewhat different from the management structure shown in FIG. 5 is employed. FIG. 6 illustrates a management structure example applicable to a recording medium other than optical discs, according to the AVCHD format.

With the example in FIG. 6, a directory "AVCHD" is disposed under the root directory, and a directory "BDMV" is disposed under the directory "AVCHD". Immediately under the directory "BDMV" two files of an index file "INDEX.BDM" and movie object file "MOVIEOBJ.BDM" are disposed, and also there are disposed the directory "PLAYLIST" in which playlist files are stored, the directory "CLIPINFO" in which clip information files are stored, and the directory "STREAM" in which stream data files are stored.

Note that though not shown in FIG. 6, a directory storing thumbnail files is disposed in parallel with the above-mentioned "BDMV" under the directory "AVCHD".

Also, with each directory, file names to be stored are configured so as to be different from the management structure example applied to optical discs, shown in FIG. 5. For example, with file names, capital letters are employed, and the portion after the period "." is restricted to three characters. With the example in FIG. 6, an arrangement is made wherein the index file is a file "INDEX.BDM", the movie object file is a file "MOVIEOBJ.BDM", the playlist file is a file "XXXXX.MPL", the clip information files are files "ZZZZZ.CPI", and the clip AV stream files are files "ZZZZZ.MTS".

The file "INDEX.BDM", file "MOVIEOBJ.BDM", file "XXXXX.MPL", files "ZZZZZ.CPI", and files "ZZZZZ.MTS" correspond to the file "index.bdmv", file "MovieObject.bdmv", files "xxxxx.mpls", files "zzzzz.clpi", and files "zzzzz.m2ts" in FIG. 5, respectively.

1-3. Respective File Configurations

Of the respective files shown in FIGS. 5 and 6, description will be made in more detail regarding files having close relations with the present invention. Now, let us say that the description of the respective files shown in FIG. 6 will be substituted with the description of the corresponding files shown in FIG. 5. First, description will be made regarding the file "index.bdmv" disposed immediately under the directory "BDMV". FIG. 7 shows a syntax representing a structure example of this file "index.bdmv". Here, the syntax is shown based on the description method of C programming language employed as a program description language such as a computer device or the like. This is similarly applied to the diagrams representing other syntaxes.

In FIG. 7, a field TypeIndicator has a data length of 32 bits, and indicates that this file is the index table. A field TypeIndicator2 has a data length of 32 bits, and indicates the version of this file "index.bdmv". A field IndexesStartAddress has a data length of 32 bits, and indicates the start address of a block blkIndexes( ) within this syntax.

A field ExtensionDataStartAddress has a data length of 32 bits, and indicates the start address of a block blkExtensionData( ) within this syntax. The blkExtensionData( ) is a block that enables predetermined extended data to be stored. The field ExtensionDataStartAddress is the relative byte count from the first byte of this file "index.bdmv", and indicates the start address of the block blkExtensionData( ). The relative byte count is started from zero. If the value of this field ExtensionDataStartAddress is zero, this indicates that there is no block blkExtensionData( ) within this file "index.bdmv".

Subsequently to the field ExtensionDataStartAddress, an area reserved of a data length of 192 bytes is disposed. Note that the area reserved is an area for addition of a field which may be used in the future. This is similarly applied to the following description. A block blkAppInfoBDMV( ) is a block whereby a content producer can describe arbitrary information, and does not affect the operation of a player, and the like.

The block blkIndexes( ) is the substantial content of this file "index.bdmv", and according to the content described in the block blkIndexes( ), first playback wherein playback is performed at the time of mounting a disc on a player, or a title (movie object) called out from the top menu is specified. A later-described playlist file is read in based on the command described in the movie object called out with the index table, or the like.

FIG. 8 shows a syntax representing a structure example of the block blkIndexes( ). A field Length has a data length of 32 bits, and indicates a data length from immediately after this field Length to the end of this block blkIndexes( ). Subsequently, a block FirstPlaybackTitle( ) and block MenuTitle( ) are disposed.

With the block FirstPlaybackTitle( ), information relating to an object employed for first playback is described. With the block FirstPlaybackTitle( ), a fixed value "1" is described subsequently to an area reserved having a data length of one bit. Further, a fixed value "1" is described through an area reserved having a data length of 31 bits. Subsequently, a field FirstPlaybackTitleMobjIDRef having a data length of 16 bits is disposed through an area reserved having a data length of 14 bits. According to this field FirstPlaybackTitleMobjIDRef, the ID of a movie object employed for a first playback title is indicated.

The ID of a movie object is indicated with a value mobj_id employed as a loop variable in a for-loop sentence of the movie object based the syntax of the movie object described later with reference to FIGS. 9 and 10. With this example, the field FirstPlaybackTitleMobjIDRef stores a value mobj_id corresponding to the movie object to be referenced.

Note that with the block blkIndexes( ), the field FirstPlaybackTitleMobjIDRef within the block FirstPlaybackTitle( ) may specify a movie object of the top menu or a title.

With the block MenuTitle( ), information relating to an object employed for the top menu is described. With the block MenuTitle( ), a fixed value "1" is described subsequently to an area reserved having a data length of one bit. Further, a fixed value "1" is described through an area reserved having a data length of 31 bits. Subsequently, a field MenuTitleMobjIDRef having a data length of 16 bits is disposed through an area reserved having a data length of 14 bits. The field MenuTitleMobjIDRef indicates the ID of a movie object employed for the menu title.

A field NumberOfTitles after the block MenuTitle( ) has a data length of 16 bits, and indicates the number of playable titles. In accordance with the following for-loop sentence, a block MovieTitle[title_id]( ) is described by the number of times indicated with this field NumberOfTitles with a value title_id as an argument. With the block MovieTitle [title_id]( ), information for each title is described. The value title_id is a numerical value from zero to the value indicated with the field NumberOfTitles, and distinguishes titles.

With the block MovieTitle[title_id]( ), a fixed value "1" is described through an area reserved having a data length of one bit. Further, a field MovieTitleMobjIDRef is described through an area reserved having a data length of 46 bits. The field MovieTitleMobjIDRef has a data length of 16 bits, and indicates the ID of a movie object employed for this title. An area reserved having a data length of 32 bits is disposed after the field MovieTitleMobjIDRef.

FIG. 9 shows a syntax representing a file "MovieObject.bdmv" disposed immediately under the directory "BDMV". A field TypeIndicator has a data length of 32 bits (four bytes), and indicates that this file is the file "MovieObject.bdmv". The field TypeIndicator is described with a character string made up of four characters encoded with the encoding method stipulated by ISO (International Organization for Standardization) 646. With the example in FIG. 9, a field TypeIndicator is described with a character string "MOBJ" which is four characters encoded with the method stipulated in ISO 646, and indicates that this file is the file "MovieObject.bdmv".

A field TypeIndicator2 has a data length of 32 bits (four bytes), and indicates the version number of this file "MovieObject.bdmv". With this file "MovieObject.bdmv", the field TypeIndicator2 needs to be a character string "0100" which is four characters encoded with the encoding method stipulated in ISO 646.

A field ExtensionDataStartAddress has a data length of 32 bits, and indicates the start address of a block blkExtensionData( ) within this syntax. The field ExtensionDataStartAddress is the relative byte count from the first byte of this file "MovieObject.bdmv", and indicates the start address of the block blkExtensionData( ). The relative byte count is started from zero. If the value of this field ExtensionDataStartAddress is zero, this indicates that there is no block blkExtensionData( ) within this file "MovieObject.bdmv".

Note that a field padding_word within the syntax shown in FIG. 9 has a data length of 16 bits, and is inserted in a for-loop sentence by the number of times shown in values N1 and N2 in accordance with the syntax of this file "MovieObject.bdmv". The values N1 and N2 are zero or an arbitrary integer. Also, an arbitrary value can be employed as the field padding_word.

An area reserved having a data length of 224 bits is disposed subsequently to the field ExtensionDataStartAddress, following which a block blkMovieObjects( ) which is the substance of this file "MovieObject.bdmv" is stored.

FIG. 10 shows a syntax representing a structure example of the block blkMovieObjects( ). A field Length has a data length of 32 bits, and indicates a data length from immediately after this field Length to the end of this block blkMovieObjects( ). A field NubmerOfMobjs is disposed through an area reserved having a data length of 32 bits. The field NumberOfMobjs indicates the number of movie objects to be stored in accordance with a for-loop sentence immediately thereafter. Movie objects are uniquely determined with a value mobj_id employed as a loop variable of the for-loop sentence. The value mobj_id is a value started from zero, and the movie objects are defined with the order described in the for-loop sentence.

A block TerminalInfo( ) within the for-loop sentence is described with a fixed value "1", following which an area reserved having a data length of 15 bits is disposed. Subsequently thereto, a field NumberOfNavigationCommands [mobj_id] having a data length of 16 bits is disposed. The field NumberOfNavigationCommands[mobj_id] represents the number of navigation commands (NavigationCommand) included in the MovieObject[mobj_id]( ) indicated with the value mobj_id.

According to the next for-loop sentence with a value command_id as a loop variable, the navigation commands are described by the number of times indicated with the field NumberofNavigationCommands[mobj_id]. That is to say, a field NavigationCommand[mobj_id][command_id] disposed within the for-loop sentence stores the navigation command NavigationCommand of the order indicated with the value command_id included in the block MovieObject[mobj_id] indicated with the value mobj_id. The value command_id is a value started from zero, and the navigation commands NavigationCommand are defined with the order described in the for-loop sentence.

FIG. 11 shows a syntax representing a structure example of the playlist file "xxxxx.mpls". A field TypeIndicator has a data length of 32 bits (four bytes), and indicates that this file is a playlist file. A field TypeIndicator2 has a data length of 32 bits (four bytes), and indicates the version of this playlist file. A field PlayListStartAddress has a data length of 32 bits, and indicates the start address of a block blkPlayList( ) within this syntax.

A field PlayListMarkStartAddress has a data length of 32 bits, and indicates the start address of a block blkPlayListMark( ) within this syntax. A field ExtensionDataStartAddress has a data length of 32 bits, and indicates the start address of a block blkExtensionData( ) within this syntax. The field ExtensionDataStartAddress is a value representing the start address of the block blkExtensionData( ) with the relative byte count from the first byte of the file "xxxxx.mpls". The relative byte count is started from zero. If the value of this field ExtensionDataStartAddress is zero, this indicates that there is no block blkExtensionData( ) within this file "xxxxx.mpls".

A block blkAppInfoPlayList( ) is disposed through an area reserved having a data length of 160 bits. With the block blkAppInfoPlayList( ), information such as the type of the playlist, playback restrictions, and so forth described in the next block blkPlayList( ) is described. With the block blkPlayList( ), a playlist is described. With a block blkPlayListMark( ), a point to be jumped with chapter jump and the like is described. The block blkExtensionData( ) is a block that enables predetermined extended data to be stored.

Note that a field padding_word within the syntax shown in FIG. 11 has a data length of 16 bits, and is inserted in a for-loop sentence by the number of times shown in values N1, N2, and N3 in accordance with the syntax of this file "xxxxx.mpls". The values N1, N2, and N3 are zero or an arbitrary integer. Also, an arbitrary value can be employed as the field padding_word.

FIG. 12 shows a syntax representing a structure example of the block blkPlayList( ). A field Length has a data length of 32 bits, and indicates a data length from immediately after this field Length to the end of this block blkPlayList( ). An area reserved having a data length of 16 bits is disposed subsequently to the field length, following which a field NubmerOfPlayItems is disposed. The field NubmerOfPlayItems has a data length of 16 bits, and indicates the number of play items included in this block blkPlayList( ). A field NumberOfSubPath indicates the number of sub paths included in this block blkPlayList( ).

In accordance with the next for-loop sentence, the block blkPlayItem( ) where a play item is described is described by the number of times indicated with the field NumberOfPlayItems. The number of counts based on the for-loop sentence becomes an identifier PlayItem_id of the block blkPlayItem( ). Further, in accordance with the next for-loop sentence, the block blkSubPath( ) is described by the number of times indicated with the field NumberOfSubPath. The number of counts based on the for-loop sentence becomes an identifier SubPath_id of the block blkSubPath( ).

Note that as to a main path principally corresponding to a play item to be played, a sub path can be provided corresponding to a sub play item. A sub path is employed for specifying a sub picture to be played in sync with a clip specified with a play item, for example, at the time of specifying audio data for off-the-record, or synthesizing two pictures.

FIG. 13 shows a syntax representing a structure example of the block blkPlayItem( ). A field Length has a data length of 16 bits, and indicates a data length from immediately after this field Length to the end of the block blkPlayItem( ).

A field ClipInformationFileName[0] has a data length of 40 bits (five bytes), and indicates the file name of the clip information file referenced by this block blkPlayItem( ) With this play item, the clip information file of the file name indicated with the field ClipInformationFileName[0] is read out. A field ClipCodecIdentifier[0] has a data length of 32 bits (four bytes), and indicates a codec method of a clip AV stream employed for the play item according to this block blkPlayItem( ).

A field ConnectionCondition is disposed through an area having a data length of 12 bits. The field ConnectionCondition has a data length of 4 bits, and indicates information relating to a connection state between clips. As the value of the field ConnectionCondition "1", "5", or "6" is employed as to a recording medium for recording. The value "1" of the field ConnectionCondition indicates that the clip thereof and the clip immediately thereafter are not connected seamlessly, and the value "5" or "6" of the field ConnectionCondition indicates that the clip thereof and the clip immediately thereafter are connected seamlessly. Note that "connected seamlessly (seamless connection)" means that playback control between clips is performed such that a clip and another clip are consecutively played at frame timing.

Figure 14A:
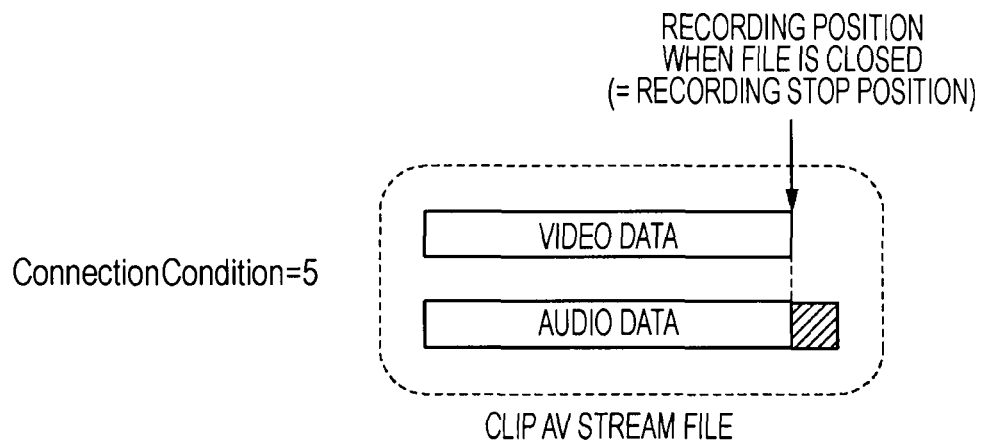
FIGS. 14A and 14B are schematic diagrams for describing first and second seamless connections.

When the value of the field ConnectionCondition is "5", with the clip referenced by the play item, the recording length of audio data is set longer as to the recoding length of video data (see FIG. 14A). According to this, fade-out processing of audio data can be performed at the time of connecting clips. For example, in a case wherein a clip is closed with recoding stop operations by a user, the value of the field ConnectionCondition is set to "5". Hereafter, the clip connection method indicated with the value "5" of the field ConnectionCondition will be referred to as a "first seamless connection".

Figure 14B:
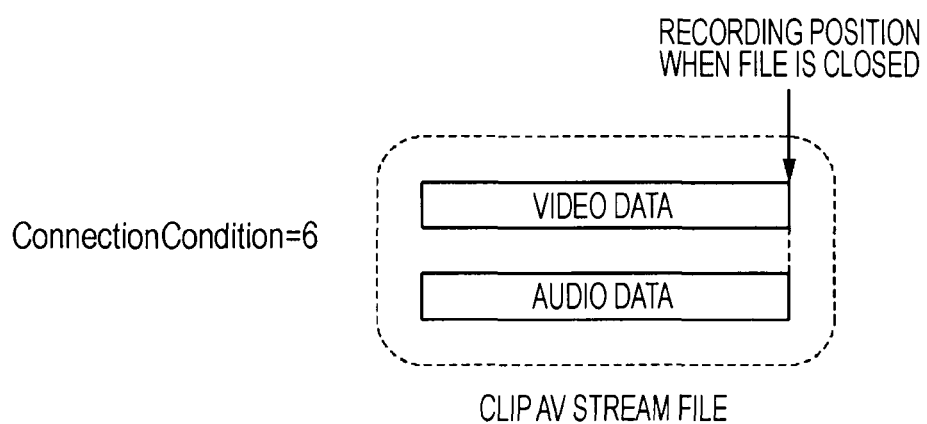

When the value of the field ConnectionCondition is "6", with the clip referenced by the play item, the recording length of audio data is set equally or shorter as to the recoding length of video data (see FIG. 14B). According to this, connection between clips can be performed seamlessly. For example, in a case wherein a clip is closed based on a reason other than recording stop according to a user's operations, e.g., a system cause, the value of the field ConnectionCondition is set to "6". Hereafter, the clip connection method indicated with the value "6" of the field ConnectionCondition will be referred to as a "second seamless connection".

Note that the second seamless connection is referred to as a "file break", according to the value "6" of the field ConnectionCondition, a boundary state or condition is indicated at the time of dividing a series of a stream file into multiple stream files.

A field RefToSTCID[0] has a data length of 8 bits, and indicates information relating to a STC (System Time Clock) discontinuous point. A field INTime and field OUTTime each have a data length of 32 bits, and indicate a main clip AV stream playback range. The field INTime indicates a start point (IN point), and the field OUTTime indicates an end point (OUT point).

A block blkUOMaskTable( ) is a table where user input reception restrictions are set. A flag PlayItemRandomAccessFlag having a data length of one bit stipulates whether to permit random access as to the play item according to this block blkPlayItem( ). Subsequently, a field StillMode is disposed through an area reserved having a data length of seven bits. The field StillMode has a data length of eight bits, and indicates whether to display the last displayed picture as a still image with the play item according to the block blkPlayItem( ). When the value of the field StillMode is "0x01" (binary), still time is indicated with a field StillTime having a data length of 16 bits based on an if sentence. When the value of the field StillMode is other than "0x01", the area having a data length of 16 bits is set to an area reserved that has been reserved for word alignment.

With a block blkSTNTable( ), the attributes of a clip AV stream, PID number, recording position on a recording medium, and the like are managed with the play item according to this block blkPlayItem( ).

FIG. 15 shows a syntax representing a structure example of the block blkPlayListMark( ). A field Length has a data length of 32 bits, and indicates a data length from immediately after this field Length to the end of the block blkPlayListMark( ).

A field NumberOfPlayListMarks has a data length of 16 bits, and indicates the number of playlist marks included in this block blkPlayListMark( ). In accordance with the next for-loop sentence, information of playlist marks is described by the number of times indicated with the field NubmerOfPlayListMarks. Each of the playlist marks is distinguished with a loop variable PL_mark_id of the for-loop sentence.

A field MarkType is disposed within the for-loop sentence subsequently to an area reserved having a data length of eight bits. The field MarkType has a data length of eight bits, and indicates the type of a mark. With a playlist mark, two types of an entry mark (Entry Mark) and link point (Link Point) are defined, and this field MarkType indicates whether or not the mark is which type. In order to define a chapter, an entry mark is employed. That is to say, a chapter is defined as a section between two playlist marks. The link point has little relevance as to the present invention, so description thereof will be omitted. The above-mentioned field NubmerOfPlayListMarks indicates a value wherein the entry marks and link points are totaled.

A field RefToPlayItemID has a data length of 16 bits, and is described with identification information PlayItem_id which references a play item to be appended with a mark. A field MarkTimeStamp has a data length of 32 bits, and is described with a timestamp indicating a point to be appended with a mark. A field EntryESPID has a data length of 16 bits, and indicates the value of PID of a TS packet including an elementary stream indicated with a mark. A field Duration is an integer with no sign having a data length of 32 bits, measured with 45-kHz clock as increments. When the value stored in this field Duration is zero, the field Duration has no meaning.

FIG. 16 shows a syntax representing a structure example of a clip information file. A field TypeIndicator has a data length of 32 bits (four bytes), and indicates that this file is a clip information file. A field TypeIndicator2 has a data length of 32 bits (four bytes), and indicates the version of this clip information file.

This clip information file includes a block blkClipInfo( ), block blkSequenceInfo( ), block blkProgramInfo( ), block blkCPI( ), block blkClipMark( ), and block blkExtensionData( ), and a field SequenceInfoStartAddress, field ProgramInfoStartAddress, field CPIStartAddress, field ClipMarkStartAddress, and field ExtensionDataStartAddress, each have a data length of 32 bits, and each indicate the start address of each corresponding block.

A field ExtensionDataStartAddress is the relative byte count from the first byte of this clip information file, and indicates the start address of a block blkExtensionData( ). The relative byte count is started from zero. If the value of this field ExtensionDataStartAddress is zero, this indicates that there is no block blkExtensionData( ) within this file "index.bdmv".

The block blkClipInfo( ) is started from after an area reserved having a data length of 96 bits subsequently to the fields indicating the start addresses. With the block blkClipInfo( ), information relating to a clip AV stream managed with this clip information file is described. With the block blkSequenceInfo( ), information for managing a sequence wherein STC and ATC (Arrival Time base) are continued as a group is described. With the block blkProgramInfo( ), information such as the encoding method of a clip AV stream managed with the clip information file, the aspect ratio of video data within the clip AV stream, and so forth is described. With the block blkClipMark( ), an index point (jump point) for cueing, appended to a clip, such as a chapter position or the like, is described. The block blkCPI( ) stores information relating to characteristic point information CPI representing a characteristic position within an AV stream, such as a random access start point, and the like.

FIG. 17 shows a syntax representing a structure example of the block blkClipInfo( ). A field Length has a data length of 32 bits, and indicates a data length from immediately after this field Length to the end of the block blkClipInfo( ). A field ClipStreamType is disposed through an area reserved having a data length of 16 bits.

The field ClipStreamType has a data length of eight bits, and represents the type of a clip AV stream. The value of this field ClipStreamType is fixed to "1", for example. A field ApplicationType has a data length of eight bits, and indicates whether or not a clip AV stream (file of which the extension is "m2ts") is created with what kind of multiplexing. When the value of the field ApplicationType is "1", with the corresponding clip AV stream, an ordinary moving image is played. Subsequently, an area reserved having a data length of 31 bits is disposed.

A flag IsCC5 having a data length of one bit indicates whether or not connection between the corresponding clip and the next clip is performed with the above-mentioned first seamless connection, i.e., the method indicated with the value "5" of the field ConnectionCondition, according to the block blkPlayItem( ) in a playlist. When the value of the flag IsCC5 is "1" (binary value), this indicates that connection between the clips is performed with the first seamless connection.

A field TSRecordingRate represents the recording rate of a clip AV stream file with bytes per second. A field NumberOfSourcePackets represents the number of packets included in the Clip AV stream. A block TSTypeInfoBlock( ) is disposed through an area reserved having a data length of 1024 bits reserved by the system. The block TSTypeInfoBlock( ) stores information indicating the type of a packet in which the clip AV stream is stored. This block TSTypeInfoBlock( ) has little relevance as to the present invention, so detailed description thereof will be omitted.

Information of the next if sentence and thereafter is described in a case wherein the value of the above-mentioned flag IsCC5 is "1", i.e., connection between the corresponding clip and the next clip is performed with the first seamless connection. A field FollowingClipStreamType is disposed through an area reserved having a data length of eight bits after the if sentence. The field FollowingClipStreamType has a data length of eight bits, and is described with the type of the clip after the clip corresponding to the clip information file. A field FollowingClipInformationFileName is disposed through an area reserved having a data length of eight bits.

The field FollowingClipInformationFileName has a data length of 40 bits (five bytes), and is described with the file name of the clip information file corresponding to the clip after the clip corresponding to this clip information file. The next field ClipCodecIdentifier has a data length of 32 bits (four bytes), and indicates the encoding method of the next clip. With this example, the field ClipCodecIdentifier is fixedly set to the character string value "M2TS" of four characters encoded with the method stipulated in ISO 646. Subsequently, an area reserved having a data length of eight bits is disposed.

FIG. 18 shows a syntax representing a structure example of the block blkCPI( ) in a clip information file. With an encoded stream wherein inter frame compression has been performed, such as an MPEG stream, a position where decoding can be started is frequently restricted to a part of location such as the top of a GOP (Group Of Picture). CPI (Characteristic Point Information) is a database wherein information of the position of a decodable starting position thereof is collected, which is a table where playback point-in-time and the address in the file are correlated. That is to say, with the CPI, information indicating the top position in increments of decoding is converted into a table.

A database is thus determined, whereby in the case of playing from arbitrary point-in-time for example, the address within the file of the playback position can be known by referencing the CPI based on the playback point-in-time. This address indicates the top in increments of decoding, whereby the player can read out data therefrom, decode this, and display an image rapidly.

Note that the top position in increments of decoding (the top position of a GOP in this example) to be stored in this CPI will be referred to as an "EP (Entry Point) entry".

In FIG. 18, a field Length has a data length of 32 bits, and indicates a data length from immediately after this field Length to the end of this block blkCPI( ). In accordance with the next if sentence, unless the value of the field Length is zero, a field CPIType is disposed through an area reserved having a data length of 12 bits. The field CPIType has a data length of four bits, and indicates the type of CPI. The next block blkEPMap( ) stores a table for correlating between the PTS value and byte address of the corresponding clip AV stream file.

FIG. 19 shows a syntax representing a structure example of the block blkEPMap( ). A field NumberOfStreamPIDEntries is disposed through an area reserved having a data length of eight bits. The field NumberOfStreamPIDEntries has a data length of eight bits, and indicates the number of entries of a block blkEPMapForOneStreamPID in the block blkEPMap( ). In accordance with a first for-loop sentence, information relating to an entry point is described by the number of times indicated with the field NumberOfStream-PIDEntries with a value[k] as a loop variable.

A field StreamPID[k] within the first for-loop sentence has a data length of 16 bits, and indicates the value of PID of a transport packet for transporting an elementary stream referenced with the block blkEPMapForOneStreamPID that is entered at the [k]'th (hereafter, referred to as the [k]'th block blkEPMapForOneStreamPID) within the block blkEPMap( ).

A field EPStreamType[k] is disposed through an area reserved having a data length of 10 bits. The field EPStream-Type[k] has a data length of four bits, and indicates the type of an elementary stream referenced with the [k]'th block blkEP-MapForOneStreamPID. A field NumberOfEPCoarseEntries[k] has a data length of 16 bits, and indicates the number of entries of sub tables for coarse search (EP coarse table) within the [k]'th block blkEPMapForOneStreamPID. A field NumberOfEPFineEntries[k] has a data length of 18 bits, and indicates the number of entries of sub tables for fine search (EP fine table) within the [k]'th block blkEPMapForOneStream-PID. A field EPMapForOneStreamPIDStartAddress[k] has a data length of 32 bits, and indicates a relative byte position where the [k]'th block blkEPMapForOneStreamPID starts within the block blkEPMap( ). This value is indicated with the number of bytes from the first byte of the block blkEPMap( ).

After description of the above-mentioned first for-loop sentence, in accordance with a third for-loop sentence described through a padding word (second for-loop sentence) having a data length of 16-bit integral multiple, with a value [k] as a loop variable, the block blkEPMapForOneStreamPID (EPStreamType[k], NumberOfEPCoarseEntries[k], and NumberOfEPFineEntries[k]) is stored by the number of times indicated with the field NumberOfStreamPIDEntries. That is to say, the argument NumberOfEPCoarseEntries[k] indicates the number of an entry PTSEPCoarse and entry SPNEPCoarse stored in the sub table (EP coarse table). Similarly, the argument NumberOfEPFineEntries[k] indicates the number of an entry PTSEPFine and entry SPNEPFine stored in the sub table (EP fine table). Hereafter, the argument NumberOfEPCoarseEntries[k] and argument NumberOfEPFineEntries[k] will be referred to as an entry count Nc and entry count Nf, respectively, as appropriate.

FIG. 20 shows a syntax representing a structure example of the block blkEPMapForOneStreamPID(EP_stream_type, Nc, Nf) In order to describe the semantics of the block blkEP-MapForOneStreamPID(EP_stream_type, Nc, Nf), description will be made first regarding the meanings of an entry PTSEPStart and entry SPNEPStart which are entries serving as data sources to be stored in the block blkEPMapFor-OneStreamPID(EP_stream_type, Nc, Nf).

The entry PTSEPStart, and the entry SPNEPStart correlated with the entry PTSEPStart indicate entry points on an AV stream, respectively. Subsequently, the entry PTSEPFine, and the PTSEPCoarse correlated with the PTSEPFine are derived from the same entry PTSEPStart. Also, the entry SPNEPFine, and the SPNEPCoarse correlated with the SPNEPFine are derived from the same entry SPNEPStart.

Figure 21:
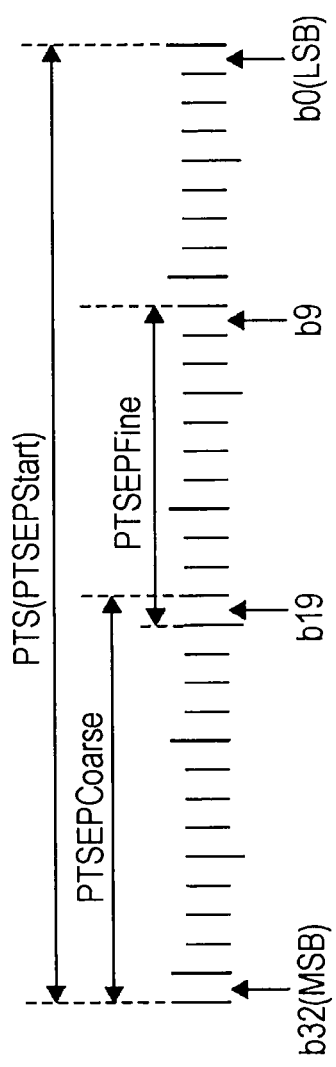
FIG. 21 is a schematic diagram illustrating a format example of an entry PTSEPCoarse and entry PTSEPFine.

FIG. 21 illustrates an example format of the entry PTSEP-Coarse and entry PTSEPFine. PTS, i.e., the entry PTSEP-Start, is a value having a data length of 33 bits. When assuming that the MSB (Most Significant Bit) is the 32nd bit, and the LSB (Least Significant Bit) is the 0th bit, with the example in FIG. 21, with the entry PTSEPCoarse employed at the time of performing search in coarse increments, 14 bits from the 32nd bit to the 19th bit of the entry PTSEPStart are employed. According to the entry PTSEPCoarse, search can be performed in a range up to 26.5 hours with resolution in 5.8 sec. Also, with the entry PTSEPFine for performing further fine search, 11 bits of the 19th bit to the 9th bit of the entry PTSEPStart are employed. According to the entry PTSEPFine, search can be performed in a range up to 11.5 hours with resolution in 5.7 msec. Note that the 19th bit is employed in common by the entry PTSEPCoarse and entry PTSEPFine. Also, nine bits from the 0th bit to the 8th bit at the LSB side are not employed.

FIG. 22 illustrates an example format of the entry SPNEPCoarse and entry SPNEPFine. A source packet number, i.e., the entry SPNEPStart is a value having a data length of 32 bits. When assuming that the MSB is the 31st bit, and the LSB is the 0th bit, with the example in FIG. 22, with the entry SPNEPCoarse employed at the time of performing search in coarse increments, all of the bits from the 31st bit to the 0th bit of the entry SPNEPStart are employed. Also, with the entry SPNEPFine for performing further fine search, 17 bits of the 16th bit to the 0th bit of the entry SPNEPStart are employed. According to the entry SPNEPFine, search can be performed, for example, in a range up to an AV stream file of approximately 25 MB (Mega Bytes).

Note that even in the case of a source packet number, only the value of a predetermined number of bits at the MSB side may be employed as the entry SPNEPCoarse. For example, 17 bits from the 31st bit to the 16th bit of the entry SPNEPStart are employed as the entry SPNEPCoarse, and 17 bits from the 16th bit to the 0th bit of the entry SPNEPStart are employed as the entry SPNEPFine.

The entry PTSEPStart and entry SPNEPStart are defined as follows based on the above description.

As shown in FIG. 21, the entry PTSEPStart is an integer with no sign having a data length of 33 bits, and indicates the PTS having a length of 33 bits of a video access unit which starts from a picture that can be randomly accessed (e.g., IDR (Instantaneous Decoding Refresh) picture or I (Intra) picture) within an AV stream.

As shown in FIG. 22, the entry SPNEPStart is an integer with no sign having a data length of 32 bits, and indicates an address within an AV stream of a source packet including the first byte of a video access unit correlated with the entry PTSEPStart. The entry SPNEPStart is represented in increments of source packet numbers, and is counted as a value to be incremented by one at a time for each source packet from the first source packet within the AV stream file with a value zero as an initial value.

As shown in FIG. 20, with the block blkEPMapFor-OneStreamPID (EP_stream_type, Nc, Nf), the sub table for performing search in coarse increments (EP coarse table) according to the first for-loop sentence is described, and the sub table for performing more detailed search (EP fine table) according to the second for-loop sentence based on the search result of the sub table (EP coarse table) is described.

A field EPFineTableStartAddress is disposed immediately before the first for-loop sentence. The field EPFineTableStartAddress has a data length of 32 bits, and indicates the start address of the first byte of a field ReservedEPFine[EP_fine_id] of the second for-loop with the relative byte count from the first byte of the block blkEPMapForOneStreamPID(EP_stream_type, Nc, Nf). The relative byte count is started from value zero.

According to a loop variable [i], the first for-loop sentence is repeated up to the entry count Nc of the sub table (EP coarse table), a field RefToEPFineID[i], entry PTSEPCoarse[i], and entry SPNEPCoarse[i] are stored by the number of times equivalent to the number of sets of the entry count Nc. With the first for-loop sentence, the field RefToEPFineID[i] has a data length of 18 bits, and indicates the entry number within the sub table (EP fine table) having the entry PTSEPFine correlated with the entry PTSEPCoarse indicated with the field PTSEPCoarse[i] subsequently to the field RefToEPFine[i]. The entry PTSEPFine, and the entry PTSEPCoarse correlated with this entry PTSEPFine are derived from the same entry PTSEPStart. The field RefToEPFineID[i] is given with the value of a loop variable [EP_fine_id] defined with the order described in the second for-loop sentence.

The description according to the second for-loop sentence is made after the first for-loop sentence through padding words. According to the loop variable [EP_fine_id], the second for-loop sentence is repeated up to the entry count Nf of the sub table (EP fine table), a field ReservedEPFine[EP_fine_id] having a data length of one bit, a field IEndPositionOffset[EP_fine_id] having a data length of three bits, a field PTSEPFine[EP_fine_id] having a data length of 11 bits, and a field SPNEPFine[EP_fine_id] having a data length of 17 bits are stored by the number of times equivalent to the number of sets of the entry count Nf. Of these, with the field PTSEPFine[EP_fine_id] and field SPNEPFine[EP_fine_id], the entry PTSEPFine and entry SPNEPFine referenced from the sub table (EP fine table) are each stored based on the loop variable [EP_fine_id].

The entry PTSEPCoarse and entry PTSEPFine, and the entry SPNEPCoarse and entry SPNEPFine are derived as follows. Let us say that there are provided Nf entries arrayed in ascending order of the value of the correlated data SPNEPStart within the sub table (EP fine table). Each entry PTSEPFine is derived from the corresponding entry PTSEPStart, such as shown in the following Expression (1).

$$PTSEPFine[EP\_fine\_id] = (PTSEPStart[EP\_fine\_id] >> 9)/2^{11} \quad (1)$$

The relation between the entry PTSEPCoarse and entry PTSEPFine is as the following Expressions (2) and (3).

$$PTSEPCoarse[i] = (PTSEPStart[RefToEPFineID[i]] >> 19)/2^{14} \quad (2)$$

$$PTSEPFine[RefToEPFineID[i]] = (PTSEPStart[RefToEPFineID[i]] >> 9)/2^{11} \quad (3)$$

Each entry SPNEPFine is derived from the corresponding entry SPNEPStart as the following Expression (4).

$$SPNEPFine[EP\_fine\_id] = SPNEPStart[EP\_fine\_id]/2^{17} \quad (4)$$

The relation between the entry SPNEPCoarse and entry SPNEPFine is as the following Expressions (5) and (6).

$$SPNEPCoarse[i] = SPNEPStart[RefToEPFineID[i]] \quad (5)$$

$$SPNEPFine[RefToEPFineID[i]] = SPNEPStart[RefToEPFineID[i]]/2^{17} \quad (6)$$

Note that with the above-mentioned Expressions (1) through (6), ">> x" means to employ the bits of the digits exceeding x bits from the LSB side of data.

1-4. Virtual Player

Next, description will be made schematically regarding a virtual player. Upon a disc having a data configuration such as described above being mounted on a player, the player needs to convert a command described in a movie object or the like read out from the disc into a unique command for controlling the hardware within the player. The player stores software for performing such conversion in ROM (Read Only Memory) embedded in the player beforehand. This software is referred to as a virtual player since this software causes the player to perform operations in accordance with the stipulation of the AVCHD format by mediating between the disc and player.

Figure 23A:
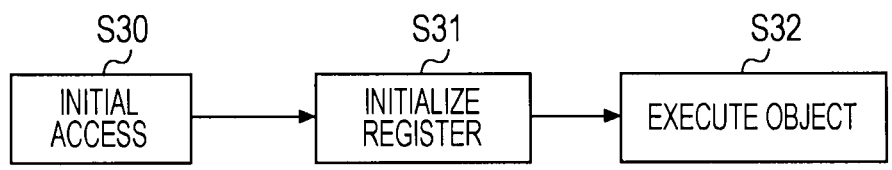
FIGS. 23A and 23B are diagrams schematically illustrating the operation of a virtual player.
Figure 23B:
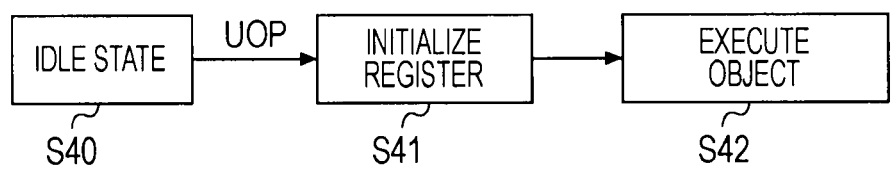

FIGS. 23A and 23B schematically illustrate the operations of this virtual player. FIG. 23A illustrates an operation example at the time of loading. Upon initial access as to the disc mounted on the player being performed (step S30), a register storing shared parameters employed in the disc in a shared manner is initialized (step S31). Subsequently, in the next step S32, a program described in a movie object or the like is read out from the disc, and executed. Note that initial access means that playback is performed for the first time such as at the time of disc loading.

FIG. 23B illustrates an operation example in a case wherein the player is instructed to perform playback, for example, by a user pressing a play key from an idle state. As to the first idle state (step S40) playback is instructed by the user using, for example, a remote control commander or the like (UO: User Operation). Upon playback being instructed, first, the register, i.e., common parameters are initialized (step S41), and in the next step S42, the phase is changed to a movie object execution phase.

Description will be made regarding playback of a playlist at the movie object execution phase with reference to FIG. 24. Let us consider a case wherein an instruction for starting playback of the content of a title number #1 is given with UO or the like. In response to the playback start instruction of the content, the player references the above-mentioned index table (Index Table) shown in FIG. 2, and obtains the number of the object corresponding to the content playback of the title #1. For example, if the number of the object for realizing the content playback of the title #1 is #1, the player starts execution of the movie object #1.

Figure 24:
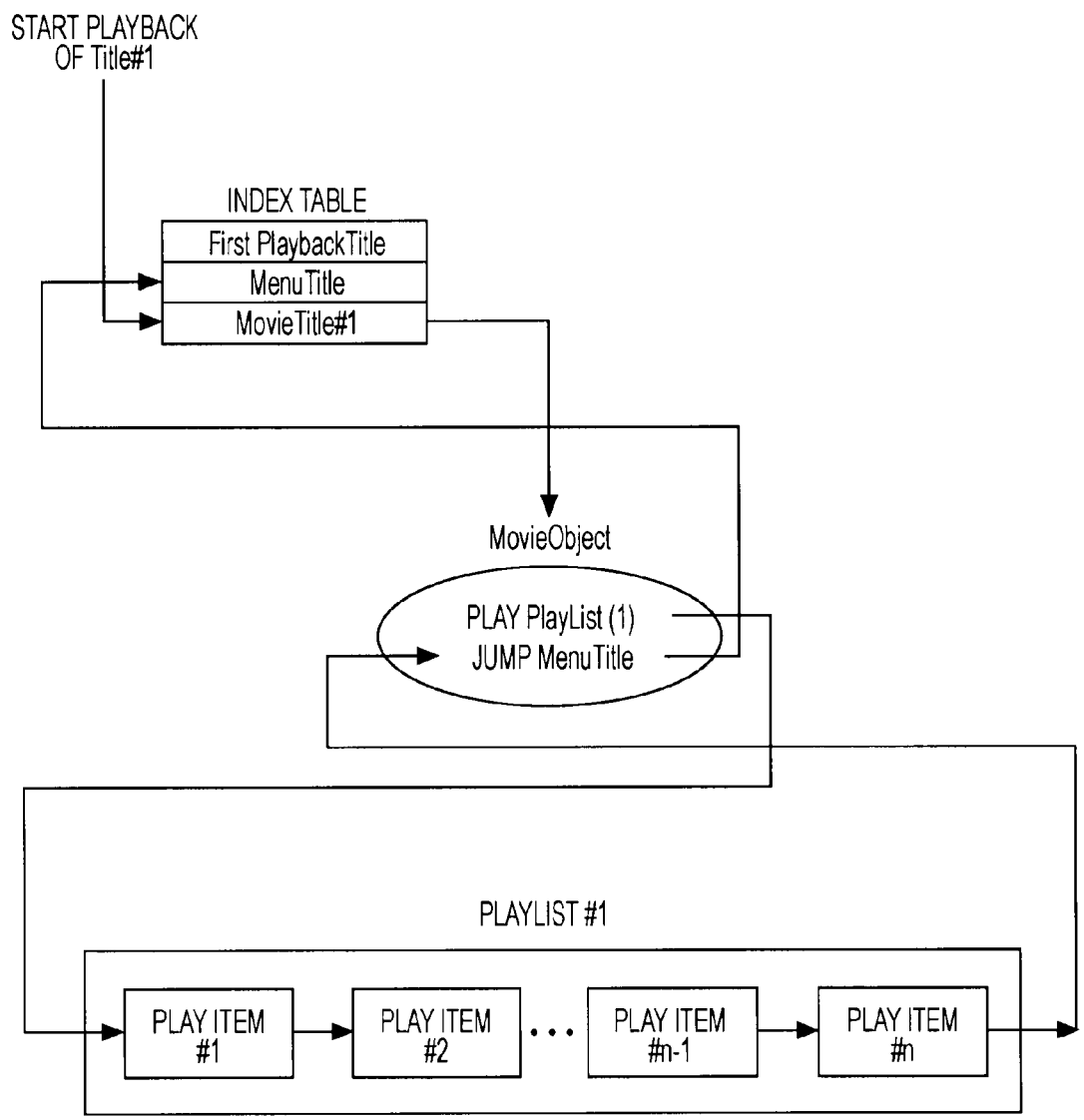
FIG. 24 is a schematic diagram schematically illustrating the operation of the virtual player.

With the example in FIG. 24, a program described in the movie object #1 is made up of two lines, and if we say that the command of the first line is "Play PlayList(1)", the player starts playback of the PlayList #1. The PlayList #1 is made up of one play item or more, and the play items are played in order. Upon playback of the play items within the PlayList #1 being completed, the player returns to execution of the movie object #1, and executes the command of the second line. With the example in FIG. 24, the command of the second line is "jump MenuTitle", this command is executed, and execution of the movie object for realizing the menu title (MenuTitle) described in the index table is started.

2. Recording Device Applicable to Present Invention

Figure 25:
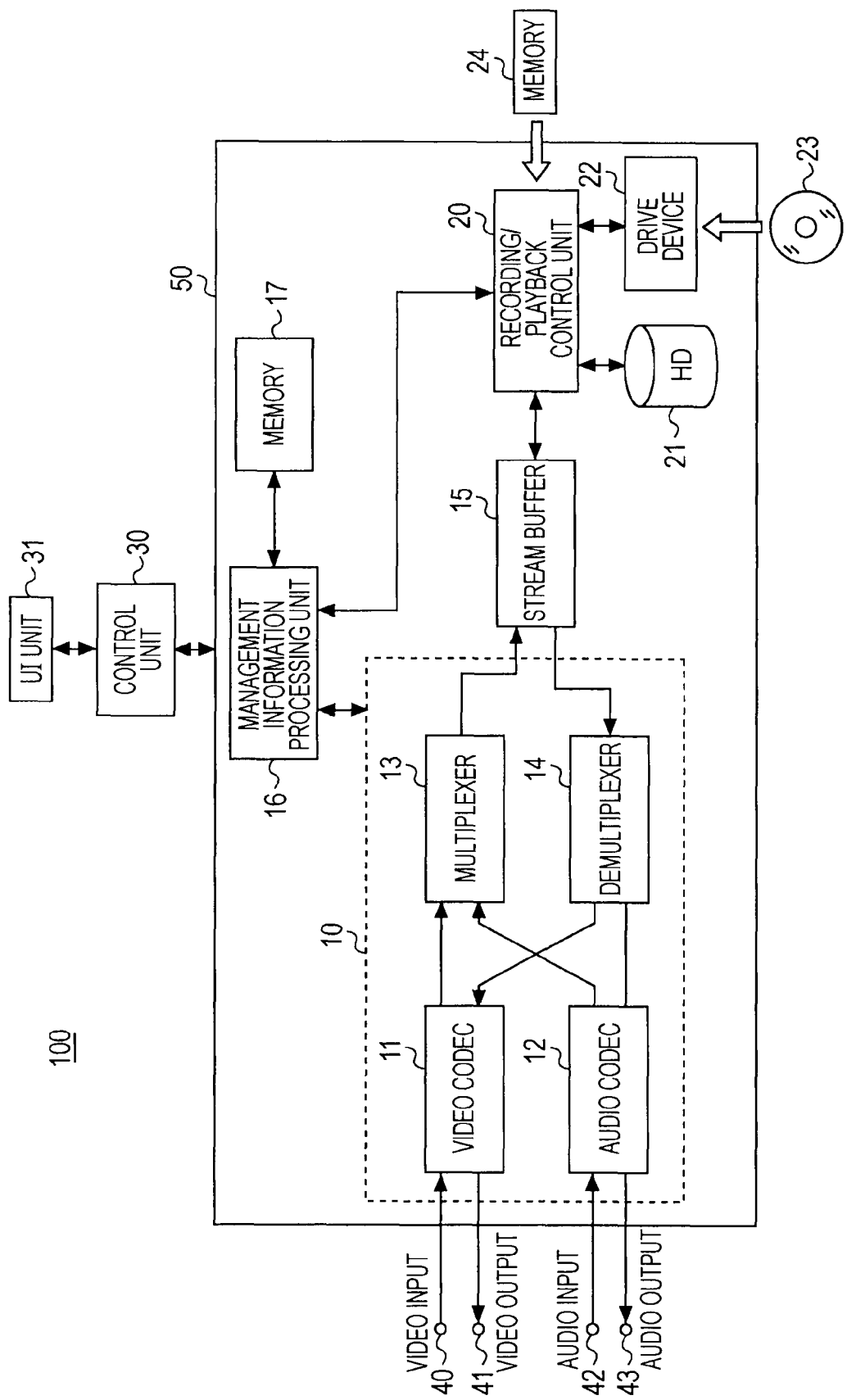
FIG. 25 is a block diagram illustrating a configuration example of a recording/playback device applicable to the present invention.

Next, description will be made regarding a recording device to which the present invention can be applied. FIG. 25 illustrates a configuration example of a recording/playback device 100 to which the present invention can be applied. The recording/playback device 100 illustrated in FIG. 25 is configured so as to record video data and audio data input externally in a recording medium, and play video data and audio data recorded in the recording medium.

Applicable compression encoding and multiplexing systems can be conceived variously. For example, the system stipulated in H.265|AVC can be applied as compression encoding according to an embodiment of the present invention. Also, as for the multiplexing system, for example, MPEG2 is applied.

Based on a program, which operates on an unshown CPU (Central Processing Unit), and data stored beforehand in ROM (Read Only Memory) connected to the CPU, a control unit 30 controls each unit of a recoding/playback unit 50 of this recording/playback device using RAM (Random Access Memory) similarly connected to the CPU as work memory. Note that in FIG. 25, routes connecting between the control unit 30 and each unit of the recording/playback unit 50 are omitted in order to avoid complexity.

A file system employed for this recording/playback device is presented with the program operating on the control unit 30. For example, based on this file system, at the time of data being recorded in later-described each recording medium, the control unit 30 performs association between a physical address of a recording medium and a file in which the data thereof is stored, and generates logical management information of the file in which each piece of data is stored. The above-mentioned directory structures shown in FIGS. 5 and 6 are examples of file logical management information. Creation of a new file, and file opening/closing, are controlled by the control unit 30 based on the file system.

A UI (User Interface) unit 31 is provided with a handler which allows the user to operate the operation of this recording device in a predetermined manner, and outputs a control signal according to an operation as to the handler. This control signal is supplied to the control unit 30. The control unit 30 controls the operation of each unit of the recording/playback unit 50 based on the processing of the program performed based on the control signal supplied from the UI unit 31 according to the user's operation. Also, the UI unit 31 includes a simple display unit, whereby predetermined display, e.g., information indicating a chapter to be dubbed, and so forth can be displayed.

For example, according to the operation performed as to the UI unit 30, the start and stop operation of recording operation of data as to a hard disk 21, and playback operation for playing the data from the hard disk 21, by the recording/playback device are controlled by the control unit 30. Also, for example, according to an operation performed as to the UI unit 31, a mark is appended to a clip, and a chapter is set.

A signal processing unit 10 includes a video codec unit 11, audio codec unit 12, multiplexer 13, and demultiplexer 14. The video codec unit 11 includes a video encoding unit for compression-encoding and outputting the video data of input baseband, and a video decoding unit for decoding the compression-encoded and input compressed video data to output this as the baseband video data. Also, the video codec unit 11 includes buffer memory capable of storing multi-frame video data. This buffer memory is shared and used by the video encoding unit and video decoding unit.

The video encoder unit pools the digital video data of the baseband supplied from a terminal 40 in the buffer memory, and compression-encodes this using a predetermined system. With this example wherein compression encoding is carried out in accordance with the system stipulated in H.264|AVC, for example, inter frame compression is performed with DCT (Discrete Cosine Transform) and prediction in a screen, and inter frame compression is performed with motion vector, and further, entropy encoding is performed, thereby enhancing compression efficiency. The digital video data compression-encoded at the video encoder unit is output as a H.264|AVC elementary stream (ES).

The video decoding unit pools the supplied compressed video data in the buffer memory, decodes this using a decoding system corresponding to the compression encoding system, and outputs this as the digital baseband video data. For example, with this example wherein the video encoding unit performs compression encoding in accordance with a system stipulated in H.264|AVC, the video decoding unit also corresponds to the video encoder unit, and performs decoding processing in accordance with a system stipulated in H.264|AVC. The video decoding unit can perform decoding and output based on the point-in-time indicated with a DTS (Decoding Time Stamp) and PTS (Presentation Time Stamp) which are extracted by a later-described demultiplexer 14. The digital baseband video data decoded and obtained at the video decoding unit is output from a terminal 41.

The audio codec unit 12 includes an audio encoding unit for compression-encoding and outputting the input baseband audio data, and an audio decoding unit for decoding compression-encoded input compressed audio data, and outputting this as the baseband audio data.

The audio encoding unit compression-encodes the digital baseband audio data supplied from a terminal 42 using a predetermined compression encoding system, e.g., the dolby digital system. However, the compression encoding system of audio data is not restricted to the dolby digital system. It can also be conceived to employ baseband data as is without compression-encoding audio data. The audio decoding unit decodes the supplied compressed audio data using a decoding system corresponding to the compression encoding system, and outputs this as baseband audio data. With this example wherein the audio encoding unit performs compression encoding using the dolby digital system, the audio decoding unit also corresponds to the audio encoding unit, and performs decoding using a decoding system in accordance with the dolby digital system. The decoded audio data is output from a terminal 43 in sync with the video data output from the video decoding unit of the video codec unit 11.

With this example wherein multiplexing is performed in accordance with MPEG2, the multiplexer 13 multiplexes the supplied compressed video data and compressed audio data by time sharing using an MPEG2 transport stream. For example, the multiplexer 13 has buffer memory, and temporarily stores the supplied compressed video data and compressed audio data in the buffer memory. The compressed video data stored in the buffer memory is divided for each predetermined size, appended with a header, and subjected to PES (Packetized Elementary Stream) packetizing. The compressed audio data is similarly divided for each predetermined size, appended with a header, and subjected to PES packetizing. With the header, predetermined information stipulated in MPEG2 is stored, such as PTS indicating the playback point-in-time, and decoding point-in-time of data to be stored in a packet. A PES packet is further divided, and placed in the payload of a transport packet (TS packet) having a fixed length. With the header of a TS packet, a PID (Packet Identification) for identifying a data type or the like placed in the payload is stored. A header having a predetermined data length is appended to the TS packet, thereby forming a source packet.

The demultiplexer 14 performs processing opposite to that of the multiplexer 13, and extracts compressed video data and compressed audio data from a packet. For example, the demultiplexer 14 separates a header from the supplied source packet to extract TS packets, detects a PID from the headers of the TS packets, and distributes the TS packets for each data type stored in the payloads. Subsequently, with regard to each of the distributed TS packets, the demultiplexer 14 extracts the data stored in the payload, and reconstructs a PES packet. Further, the demultiplexer 14 extracts the compressed video data and compressed audio data stored in the payload of the PES packet, and adds header information to this based on the information stored in the PES header, and outputs each as one elementary stream.

A stream buffer 15 temporarily stores the source packet supplied from the multiplexer 13 (at the time of recording) or recording/playback control unit 20 (at the time of playback). Reading/writing timing of the source packet as to the stream buffer 15 is controlled in a predetermined manner, thereby taking the consistency between access speed as to later-described each recording medium, and signal processing speed such as encoding or decoding of audio and video data.

The recording/playback control unit 20 controls recording and playback of data as to multiple recording media. With the example in FIG. 25, the hard disk 21 is fixedly connected to the recording/playback control unit 20. Further, with the recording/playback control unit 20, a drive device 22 corresponding to recording/playback as to recordable type DVD 23 (hereafter, generally referred to as "DVD 23") is connected thereto, and detachable memory 24 of which the stored content is rewritable and nonvolatile can be mounted. Based on the command from an upper level such as the control unit 30 for example, the recording/playback control unit 20 performs writing of data as to the specified address, and readout of data from the specified address regarding the specified recording medium.

Note here that description has been made such that the hard disk 21, drive device 22, and memory 24 are connected to the recording/playback control unit 20, but not restricted to this example. Any one of the hard disk 21, drive device 22, and memory 24 may be omitted. Also, the multiple drive devices 22 may be connected thereto, and similarly, a plurality of memory 24 may be mounted simultaneously. Further, with above description, description has been made assuming that the drive device 22 can handle recordable type DVD, but is not restricted to this example, and for example, the drive device 22 may handle a Blu-ray disc (registered trademark) whereby greater capacity is realized.

Note that with the DVD 23 and memory 24 which are detachable recording media, at least an ejection operation is performed based on the control of the control unit 30. For example, according to the operation of an ejection button provided on the UI unit 31, or the other portion of the casing of the recording/playback device, the ejection mechanism (not shown) of the drive device 22 and memory 24 is controlled by the control unit 30, and a recording medium is ejected.

A management information processing unit 16 performs processing relating to the above-mentioned index file ("index.bdmv"), movie object file ("MovieObject.bdmv"), playlist file ("xxxxx.mpls"), and clip information file ("zzzzz.clpi").

With the management information processing unit 16, for example, functions are realized by the above-mentioned control unit 30, and program operating on the CPU. It goes without saying that the management information processing unit 16 may be configured of hardware different from the control unit 30. In a case wherein the management information processing unit 16 is realized with the program operating on the control unit 30, the RAM connected to the CPU making up the control unit 30 and management information processing unit 16 corresponds to memory 17.

Description will be made regarding operation at the time of recording with the recording/playback device having such a configuration. Note here that description will be made assuming that the video data and audio data supplied from the terminals 40 and 42 are recorded in the hard disk 21.

Baseband video data is input to the recording/playback unit 50 from the terminal 40, and supplied to the signal processing unit 10. Subsequently, this video data is supplied to the video encoding unit within the video codec unit 11. For example, in response to the recording start command by the control unit 30, the video encoding unit starts compression encoding of the supplied video data. The video encoding unit subjects the digital baseband video data to compression encoding, and outputs this as an elementary stream (ES) stipulated in H.264|AVC. This elementary stream is supplied to the multiplexer 13.

Baseband audio data is input to the recording/playback unit 50 from the terminal 42, and supplied to the signal processing unit 10. Subsequently, this audio data is supplied to the audio encoding unit within the audio codec unit 12. In response to the above-mentioned recording start command by the control unit 30, the audio encoding unit starts compression encoding of the supplied audio data. The audio data compression-encoded at the audio encoding unit is supplied to the multiplexer 13.

The multiplexer 13 multiplexes the compression-encoded supplied digital video data and digital audio data using a predetermined method, and outputs this as one data stream. Fro example, the multiplexer 13 includes buffer memory, and temporarily stores the supplied compressed video data and compressed audio data in the buffer memory.

The compressed video data stored in the buffer memory is divided for each predetermined structure, appended with a header, and subjected to PES packetizing. The compressed audio data is similarly divided for each predetermined size, appended with a header, and subjected to PES packetizing. With the header, predetermined information stipulated in MPEG2 is stored, such as PTS or DTS. A PES packet is further divided, placed in the payload of a transport packet (TS packet), and a PID for identifying the data placed in the payload is stored in the header. A header which has a predetermined data length, storing a source packet number for identifying a source packet, and the like is appended to the TS packet, thereby forming a source packet. The source packet output from the multiplexer 13 is temporarily pooled in the stream buffer 15.

The recording/playback control unit 20 monitors the amount of data pooled in the stream buffer 15, and upon data exceeding a predetermined amount being pooled in the stream buffer 15, reads out the data in increments of recording of the hard disk 21 from the stream buffer 15, and writes this in the hard disk 21.

The management information processing unit 16 generates management information, i.e., information to be stored in the above-mentioned index file, movie object file, playlist file, and clip information file using the memory 17 as work memory based on the recorded data.

For example, the management information processing unit 16 generates clip information corresponding to the clip AV stream file being recorded using the memory 17 as work memory, based on the information supplied from the control unit 30, multiplexer 13, and recording/playback control unit 20, in accordance with the control of the control unit 30. In other words, the clip information is information necessary for creating a clip information file. The generated information is held in the memory 17.

Here, of information to be stored in a clip information file, EP entries within the block blkCPI( ) are dynamic information as to recording, and are information to be generated in order along with progress of recording. The management information processing unit 16 obtains the PTS of the video access unit, and the source packet number of a source packet including the first byte of the video access unit, and generates an entry PTSEPStart and entry SPNEPStart using the volatile memory 17 as work memory. The generated entry PTSEPStart and entry SPNEPStart are held in the memory 17.

In a case wherein the recording/playback device 100 is configured so as to provide a playlist mark at a recording start position along with start of recording, a playlist mark having the playback point-in-time corresponding to the top frame to be generated according to the recording start operation as to the UI unit 31 as the value of the field MarkTimeStamp is created at the management information processing unit 16. The created playlist mark is added to information to be stored in a playlist file on the volatile memory 17, and held.

The management information stored in the memory 17 is written in the hard disk 21 at predetermined timing. For example, in response to the recording end operation as to the UI unit 31, the management information stored in the memory 17 is written in the hard disk 21. Also, writing of the management information stored in the memory 17 to the hard disk 21 can also be performed at the time of power OFF operation.

Description will be made regarding operation at the time of playback. Now, description will be made regarding a case wherein the clip recorded in the hard disk 21 as described above is played. For example, upon the power of the recording/playback device 100 being turned on, the index file and movie object file are read in from the hard disk 21, and supplied to the management information processing unit 16. The management information processing unit 16 stores the information stored in these files in the memory 17.

The control unit 30 obtains the information stored in the memory 17 from the management information processing unit 16, and based on the obtained information, causes the display unit included in the UI unit 31 to display the information relating the clip recorded in the hard disk 21, for example. Based on this display, the user performs a predetermined operation as to the UI unit 31, whereby playback of the clip recorded in the hard disk 21 can be instructed.

In response to the operation as to the UI unit 31, the control unit 30 controls the management information processing unit 16 and recording/playback control unit 20 to call out the command described in the movie object file with reference to the information of the index file stored in the memory 17, and read out the playlist file described in the command from the hard disk 21. Subsequently, based on the read playlist file, the control unit 30 reads out the clip information file to be referenced by the play item stored in the playlist file from the hard disk 21. The information stored in the playlist file and clip information file read out from the hard disk 21 is stored in the memory 17.

The control unit 30 outputs a command so as to read out the corresponding clip AV stream file based on the clip information file stored in the memory 17. In accordance with this command, the recording/playback control unit 20 reads out the clip information file and clip AV stream file from the hard disk 21. The clip AV stream file is read out from the hard disk 21 in increments of source packets, and pooled in the stream buffer 15 through the recording/playback control unit 20.

The demultiplexer 14 monitors the amount of data pooled in the stream buffer 15, and upon data exceeding a predetermined amount being pooled in the stream buffer 15, reads out the data necessary for the video decoding unit of the video codec unit 11 performing decoding from the stream buffer 15 in increments of source packets. The read source packet is supplied to the demultiplexer 14, temporarily stored in the buffer memory, and the header of the read source packet is separated to obtain TS packets. Subsequently, a PES packet is reconstructed from the data distributed for each data type based on the PID of each TS packet and stored in the payloads. Further, the data is extracted form the payload of the PES packet, and based on the information of the PES header, information specifying decoding and playback point-in-time such as DTS and PTS, header information, and the like are appended in a predetermined manner, thereby generating each elementary stream of the compression-encoded video data and audio data.

The compressed video data is supplied to the video decoding unit of the video codec unit 11. The video decoding unit pools the supplied compressed video data in the buffer memory, and upon predetermined picture worth of data being pooled, starts decoding processing as to the data pooled in the buffer memory. The decoded video data is output sequentially at frame timing in accordance with the PTS based on STC (System Time Clock) supplied from the unshown system clock, for example.

On the other hand, the compressed audio data is supplied to the audio decoding unit of the audio codec unit 12, and subjected to decoding processing in a predetermined manner. The decoded audio data is output from the audio codec unit 12 in sync with the video data decoded and output from the video codec unit 11.

3. Data Structure Applicable to Present Invention

Figure 26:
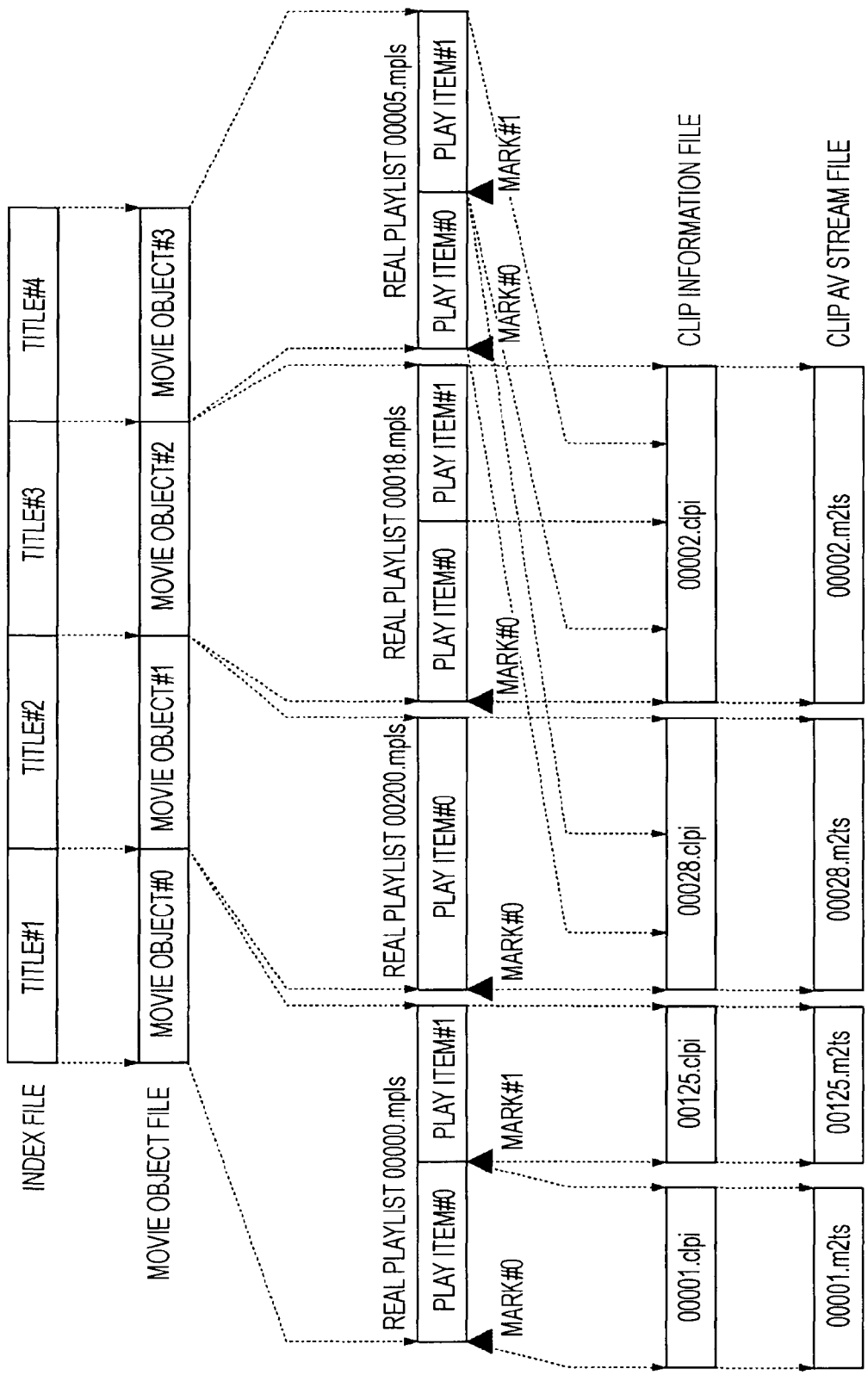
FIG. 26 is a schematic diagram illustrating a data structure example applicable to the present invention.

FIG. 26 illustrates a data structure applicable to the present invention. The index file "index.bdmv" has a single through multiple titles. The movie object file "MovieObject.bdmv" includes a single through multiple movie objects corresponding to the titles included in the index file "index.bdmv". Each of the movie objects calls out a single playlist file "xxxxx.mpls". The playlist file "xxxxx.mpls" includes a single through multiple play items, and each of the play items references a clip information file "zzzzz.clpi". The clip information file "zzzzz.clpi" has a one-on-one relation with the clip AV stream file "zzzzz.m2ts" which is the entity of a clip.

With such a structure, the user can view a clip recorded in a recording medium in increments of titles included in the index file "index.bdmv". Upon the user selecting a desired title, the movie object corresponding to the title is referenced from the movie object file "MovieObject.bdmv". Subsequently, the playlist file "xxxxx.mpls" described in the referenced movie object is called out, and the clip information file "zzzzz.clpi" is referenced in accordance with the play item included in the playlist file, and the corresponding clip AV stream file "zzzzz.m2ts" is played.

A mark (playlist mark) indicating point-in-time information is provided as to the playlist file "xxxxx.mpls", whereby a jump position can be set. A chapter is defined with a mark. A chapter is a playback increment within a title that can be viewed from the user. That is to say, the user can specify a playback position in increments of chapters. A mark is always provided at a recording start position. A mark can also be provided at a position other than a recording start position.

That is to say, a playlist mark is set as to the playlist file "xxxxx.mpls" along with start of recording, and a play item to reference a clip is registered, thereby forming a chapter as to the playlist file. In other words, it can be said that a playlist mark is recorded as to a playlist file, and a play item is recorded, thereby recording a chapter as to the playlist file.

As described above, a real playlist is generated along with a clip. With the example in FIG. 26, playlist files "00000.mpls", "00200.mpls", and "00018.mpls" have the attributes of a real playlist.

Of these files, the playlist file "00000.mpls" is an example wherein the information of a newly generated clip is additionally recorded in a playlist. For example, as to the playlist file "00000.mpls" in which a play item #0 referencing a clip information file "00001.clpi" corresponding to a clip AV stream file "00001.m2ts" has already been stored, a play item #1 referencing a clip information file "00125.clpi" corresponding to a clip AV stream file "00125.m2ts" newly recorded is additionally recorded. The top point-in-time indicated with each play item is provided with a mark. Upon this playlist file "00000.mpls" being played, first, based on the play item #0, the clip AV stream file "00001.m2ts" is played, and subsequently, based on the play item #1, the clip AV stream file "00125.m2ts" is played.

The playlist file "00200.mpls" is an example wherein a single playlist file is generated as to a single clip, and the playlist file includes only a single play item.

Further, the playlist file "00018.mpls" is an example wherein multiple play items reference a single clip. For example, control can be conceived wherein a play item is generated according to start and stop of recording, and data is additionally described as to a single clip. A mark is provided at the top of a play item #0, and the play item #0 and play item #1 are played consecutively, whereby the entirety of a clip AV stream file "00002.m2ts" is played.

On the other hand, with a virtual playlist, a playback section is specified as to a clip already existing, such as shown as a playlist file "00005.mpls" in FIG. 26. With this example, a play item #0 included in the playlist file "00005.mpls" references a clip information file "00028.clpi" to specify a section, and a play item #1 references a clip information file "00002.clpi" to specify a section. Also, the top of each of the play item #0 and play item #1 is provided a mark. Upon the playlist file "00005.mpls" being played, first, based on the play item #0, the specification section of a clip AV stream file "00028.m2ts" is played, and subsequently, based on the play item #1, a clip AV stream file "00002.m2ts" is played.

As described above, a mark (playlist mark) can also be provided at a position other than a recording start position. For example, during playback or during a temporarily stop operation (pause) of a clip, or the like, a predetermined operation is performed as to the UI unit 31, whereby a mark is provided at a position according to operating timing in the case of during playback, and provided at a position where pause is performed in the case of during pause. A mark is provided, whereby a chapter is newly defined. For example, upon a mark C being newly provided between a mark A and mark B, a chapter defined with the mark A and mark C, and a chapter defined with the mark C and mark B are newly defined. It can also be conceived that the chapter defined with the mark A and mark B can be divided into a chapter defined with the mark A and mark C, and a chapter defined with the mark C and mark B according to the setting of the mark C.

4. First Embodiment of Present Invention 4-1. Dubbing Processing According to First Embodiment Next, description will be made regarding a first embodiment of the present invention. The present invention is generally relating to processing at the time of dubbing a clip recorded in a recording medium to another recording medium, as described above. An arrangement is made wherein at the time of this dubbing, the management information of a clip recorded in a dubbing destination recording medium is generated based on the specified range specifying a dubbing range as to a dubbing source clip, and the management information as to the dubbing source clip. More specifically, at the time of specifying a dubbing position in increments of chapters, and dubbing multiple chapters, determination is made whether or not the multiple relevant chapters are connected seamlessly, and management information for managing seamless connection is generated at a dubbing destination.

Note that as described above, a chapter is defined as a section between two playlist marks. More specifically, with the block blkPlayListMark( ) within a playlist file (see FIG. 15), of playlist marks indicated with the loop variable PL_mark_id wherein the field MarkType is an entry mark, a chapter is defined as a section between two playlist marks which are adjacent to each other in time.

4-1-1. Specific Example of Dubbing Processing

Figure 27:
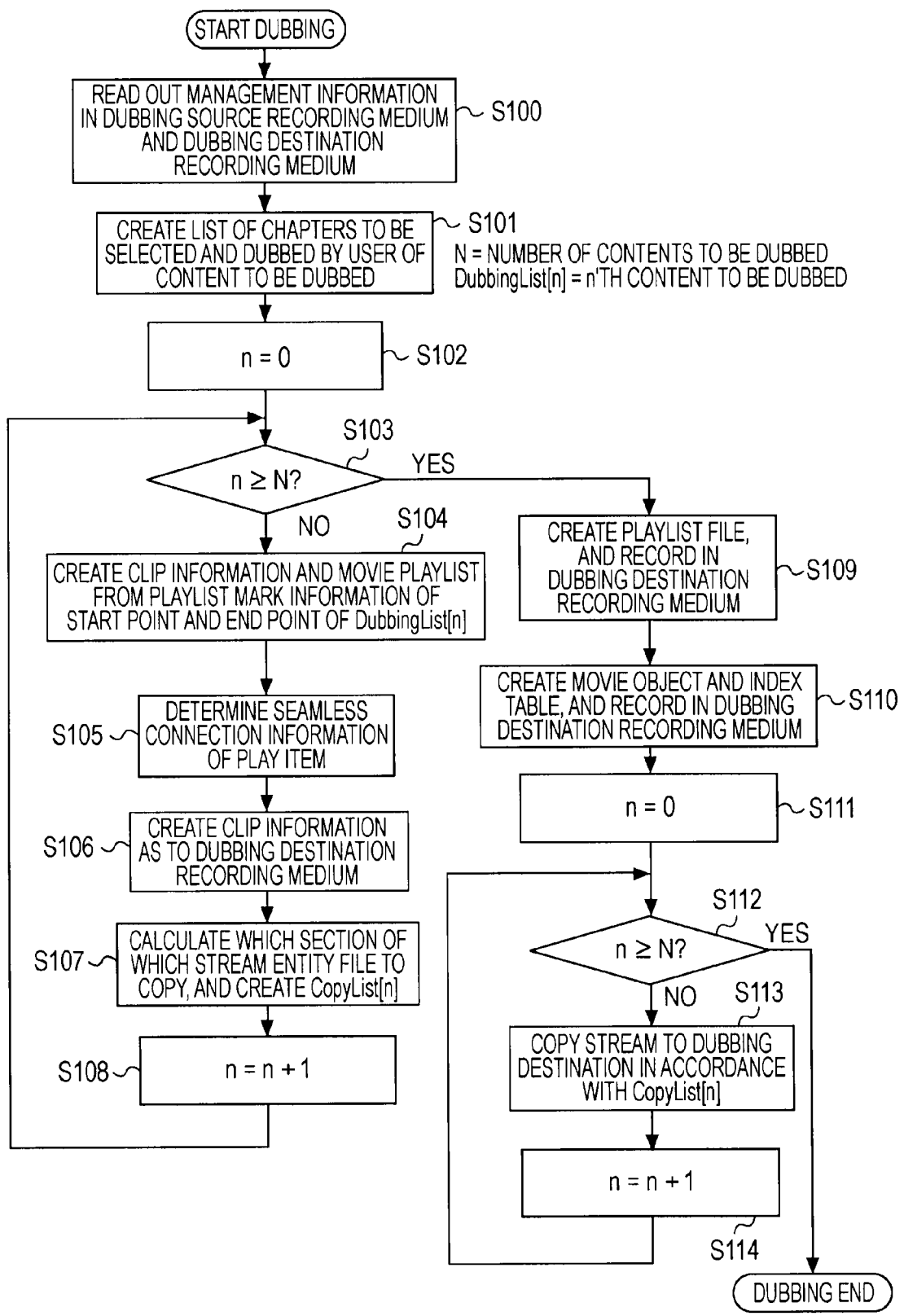
FIG. 27 is a flowchart illustrating a dubbing processing example according to a first embodiment.

Description will be made regarding a dubbing processing example according to the first embodiment with reference to the flowchart in FIG. 27. Note here that description will be made assuming that dubbing processing is performed using the recording/playback device 100 described with reference to FIG. 25, chapters recorded in the hard disk 21 are specified in increments of chapters to dub these to the DVD 23 mounted on the drive device 22. Also, each processing of the flowchart in FIG. 27 is performed in accordance with the control by the control unit 30 and management information processing unit 16 based on a predetermine program.

In order to perform dubbing processing, first, second management information of a recording medium serving as a dubbing source (hard disk 21 in this example), and first management information of a recording medium serving as a dubbing destination (DVD 23 mounted on the drive device 22 in this example), i.e., indexfile, movie object file, playlist file, and each clip information file are read out (step S100).

For example, in response to an operation for instructing start of dubbing from the hard disk 21 to the DVD 23 being performed as to the UI unit 31, the control unit 30 outputs a command to the recording/playback control unit 20 to read out these files making up the management information, which are recorded in the hard disk 21. The recording/playback control unit 20 reads out these files from the hard disk 21 in accordance with this command. Also, when the management information exists in the DVD 23 which is a dubbing destination recording medium, the recording/playback control unit 20 reads out these files from the DVD 23. The read management information is written in the memory 17 through the management information processing unit 16. Note that the clip information files may be read out from the hard disk 21 or DVD 23 at the time of specification being made.

In the next step S101, a content to be dubbed to the DVD 23 is selected from contents recorded in the hard disk 21 by the user. A content can be selected in increments of chapters. Based on the selection result of a content i.e., chapter, the control unit 30 creates a list DubbingList of chapters to be dubbed. The list DubbingList includes, for example, the timestamps of start and end points of a chapter, and information indicating the play item corresponding to the chapter thereof.

With regard to the timestamps of start and end points of a chapter, a playlist mark defining a chapter, i.e., the value of the field MarkTimeStamp corresponding to the field MarkType indicating an entry mark, described within the for-loop sentence in the block blkPlayListMark( ) within a playlist file, can be employed (see FIG. 15). Also, with regard to the information indicating the play item, the value of the field RefToPlayItemID corresponding to the field MarkType indicating the entry mark can be employed (see FIG. 15). This information can be obtained by searching the block blkPlayListMark( ) within a playlist file of the management information written in the memory 17.

Now, let us say that the number of selected chapters to be dubbed is N, and of the list DubbingList, the chapter to be dubbed at the n'th is represented with the chapter DubbingList [n]. Note that with the list DubbingList, the dubbing order of a chapter is assumed to follow the playback order defined in the playlist file of the play item to which the chapter corresponds.

As an example, the control unit 30 extracts the information of the chapter defined as to the clip recorded in the hard disk 21 based on the management information read out in step S100, and based on the extracted chapter information, outputs a command to the UI unit 31 to instruct the UI unit 31 to display a list of chapters on the display unit included in the UI unit 31. The user performs a predetermined operation as to the UI unit 31 based on the display of this list of chapters, and selects a chapter to be dubbed to the DVD 23.

Note that at the time of the user selecting a content to be dubbed in step S101, determination can be made based on the information of the selected content whether or not the content can be dubbed. For example, a content that can be dubbed can be restricted according to the property of the selected content.

As an example, it can be conceived to perform dubbing restrictions based on the recording bit rate of the clip AV stream file included in a content. For example, in a case wherein a recoding medium of which the access speed is high is taken as a dubbing source recording medium, and a recoding medium of which the access speed is slower than the dubbing source recording medium is taken as a dubbing destination recording medium, there may be a case wherein a clip AV stream file is recorded in the dubbing source recording medium at a recording bit rate exceeding the access speed of the dubbing destination recording medium. In this case, even if the clip AV stream file is dubbed to the dubbing destination recording medium from the dubbing source recording medium, the clip AV stream file dubbed from the dubbing destination recording medium cannot be played properly.

As a more specific example, a case can be conceived wherein the memory 24 implemented in the recording/playback control unit 20 is taken as a dubbing source recording medium, and the DVD 23 mounted on the drive device 22 is taken as a dubbing destination recording medium. That is to say, in a case wherein the maximum bit rate of recordable video data of the memory 24 and the maximum bit rate of recordable video data of DVD 23 are, for example, 24 Mbps (Mega bits per second) and 18 Mbps, respectively, even if a clip AV stream file recorded in the memory 24 at a recording bit rate of 24 Mbps is dubbed to the DVD 23, the clip AV stream file dubbed to the DVD 23 cannot be played normally.

Figure 28:
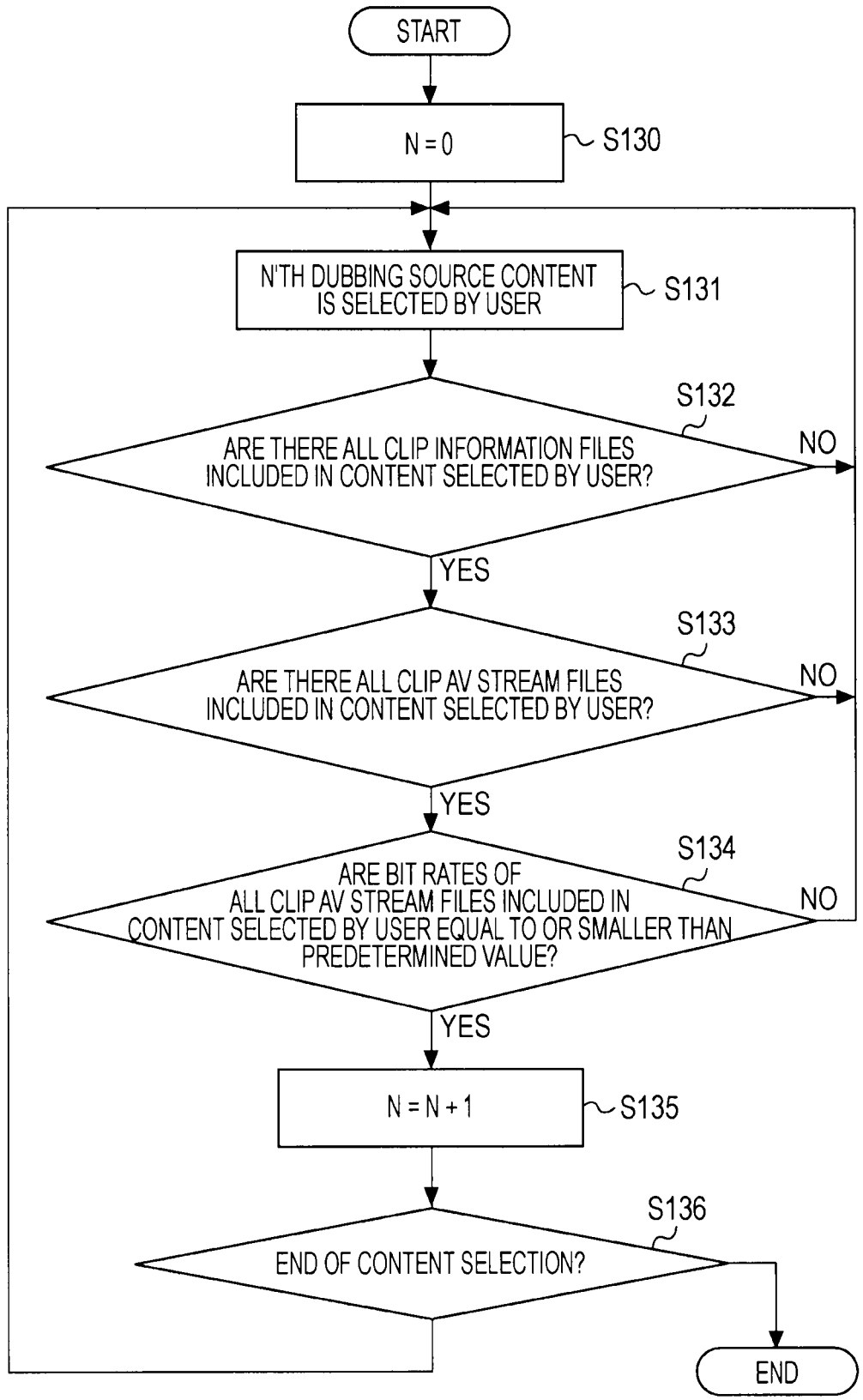
FIG. 28 is a flowchart illustrating a processing example in the case of determining whether or not the content can be dubbed based selected content information.

FIG. 28 is a flowchart illustrating a processing example in a case wherein when the user selects a content to be dubbed in step S101, determination is made based on the information of the selected content whether or not the selected content can be dubbed. First, in step S130, a value N indicating the selected chapter count is set to zero, and in step S131, the UI unit 31 is operated by the user in a predetermined manner for example, whereby the N'th dubbing source content (chapter) is selected.

In the next step S132, determination is made whether or not there are all the clip information files included in the content selected by the user. For example, with regard to the content selected in increments of chapters, the corresponding play items are obtained based on the timestamps of the start and end points of chapters, and determination is made whether or not there are the clip information files to be referenced from the obtained play items. The clip information files to be referenced from the play items can be referenced, for example, based on the field ClipInformationFileName within the block PlayItem( ) of a playlist file (see FIG. 13).

If determination is made that of the clip information files included in the content selected by the user, there is a clip information file not existing, the selected content is determined to be unable to be dubbed, and the processing returns to step S131. On the other hand, if determination is made that there are all the clip information files included in the content selected by the user, the processing proceeds to step S133.

In step S133, determination is made whether or not there are all the clip AV stream files included in the content selected by the user. For example, based on the file names of the clip information files obtained at the time of the determination processing in step S132, determination is made whether or not there is the corresponding clip AV stream file.

If determination is made that of all the clip AV stream files included in the content selected by the user, there is a clip AV stream file not existing, the selected content is determined to be unable to be dubbed, and the processing returns to step S131. On the other hand, if determination is made that there are all the clip AV stream files included in the content selected by the user, the processing proceeds to step S134.

In step S134, determination is made whether or not the bit rates of all the clip AV stream files included the content selected by the user are equal to or greater than a predetermined value. For example, with the clip information file corresponding to the clip AV stream file, the field TSRecordingRate within the block ClipInfo( ) is referenced, whereby the bit rate of the clip AV stream file can be obtained (see FIG. 17).

Note that an arrangement can be conceived wherein the predetermined value of a bit rate serving as determination reference in step S134 is set according to a dubbing destination recording medium. As an example, if a dubbing destination recoding medium is the DVD 23, based on the upper limit of a recording bit rate stipulated as to the DVD 23, the predetermined value of the bit rate is set to 18 Mbps, thereby restricting dubbing of a clip AV stream file of which the bit rate exceeds 18 Mbps.

If determination is made in step S134 that of all the clip AV stream files included in the content selected by the user, there is a clip AV stream file of which the bit rate is greater than a predetermined value, the selected content is determined to be unable to be dubbed, and the processing returns to step S131. On the other hand, if determination is made that the bit rates of all the clip AV stream files included the content selected by the user are equal to or greater than a predetermined value, the selected content is determined to be able to be dubbed, and the content, i.e., chapter is taken in the list DubbingList as a chapter DubbingList[N] to be dubbed at the N'th.

Subsequently, the processing proceeds to step S135, the chapter count N is incremented by one. In the next step S136, determination is made whether or not selection of contents has been completed. Whether or not selection of contents has been completed is determined by the control unit 30, for example, based on the control signal corresponding to the user's predetermined operation as to the UI unit 31. If determination is made that selection of contents has been completed, the processing proceeds to step S102 in FIG. 27. On the other hand, if determination is made that selection of contents has not been completed yet, the processing returns to step S131.

Description returns to the flowchart in FIG. 27, the value of the variable n is set to zero in step S102, according to determination based on the comparison result between the variable n and the value N in step S103, processing in steps S104 through S108 is repeated N times.

In step S104, based on the playlist mark information of the start and end points of the chapter DubbingList[n], clip information and a playlist at a dubbing destination are created according to the structure of the chapter. The created clip information and playlist are stored in the memory 17.

For example, in step S104, determination is made whether or not the start and end points of the chapter DubblingList[n] are identical to the IN and OUT points of the corresponding play item, and whether or not the IN point and/or OUT point of the play item corresponding to the chapter are identical to the top position and/or end position of the corresponding clip AV stream file, indicated with the clip information file referenced with the play item. Based on these determination results, clip information and a playlist in a dubbing destination recording medium (DVD 23 in this example) are created, which correspond to the chapter DubbingList[n], at the time of dubbing the chapter DubbingList[n] to the dubbing destination recording medium. In this case, the dubbing destination play item and/or clip information is created so as to be identical to the range referenced with the chapter DubbingList[n].

Also, determination is also made whether or not the chapter DubbingList[n] references multiple play items and multiple pieces of clip information. In the case of the single chapter referencing multiple play items and multiple pieces of clip information, with regard to each of the multiple play items and multiple pieces of clip information, such as described above, determination is made whether or not the start point and/or end point of the chapter are identical to the IN point and/or OUT point of the corresponding play item, and whether or not the IN point and/or OUT point of the play item are identical to the top position and/or end position of the corresponding clip AV stream file, and according to the determination results, a dubbing destination play item and clip information are created.

The play item information thus created is sequentially added as the block blkPlayItem( ) within the for-loop sentence with the identifier PlayItem_id as a loop variable in the block blkPlayList( ) exemplified in FIG. 12, thereby creating a playlist. Also, the value N indicating the count of the chapters selected in step S101 is taken as the value of the field NumberOfPlayList in the block blkPlayList( ).

4-1-2. Creation of Play Item and Clip Information of Dubbing destination

Figure 29A:
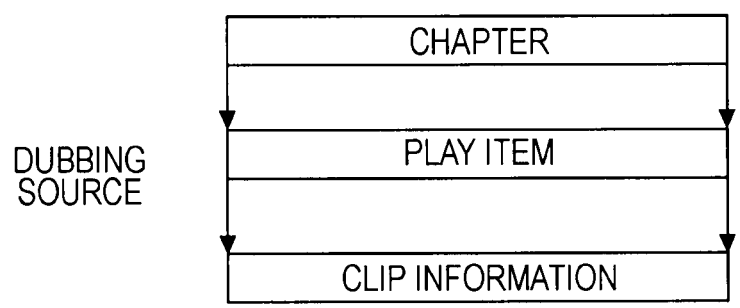
FIG. 29 is a schematic diagram for describing an example wherein a play item and clip information of a dubbing destination are created according to the relation between a chapter, play item, and clip information.
Figure 29B:
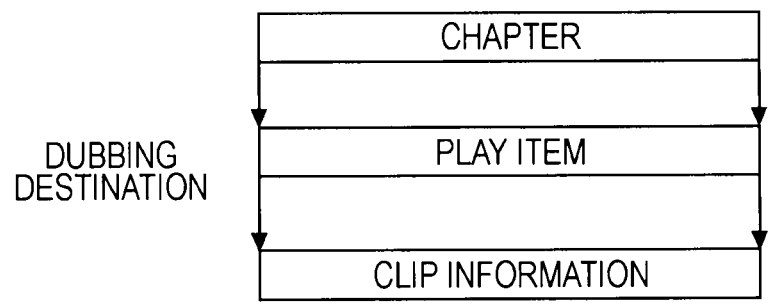

Description will be made more specifically with reference to FIGS. 29A through 32B regarding an example for creating a dubbing destination play item and clip information according to the relation between a chapter, play item, and clip information. FIG. 29A is an example wherein a dubbing source chapter references the entirety of the corresponding play item, and the play item references the entirety of the range of the elementary stream indicated with the corresponding clip information file. In this case, as exemplified in FIG. 29B, dubbing source play item and clip information can be employed as is as dubbing destination play item and clip information.

The reference relation between a chapter and play item can be obtained as follows, for example. With regard to the chapter DubbingList[n] to be processed, the timestamps indicated with the playlist marks of the respective start and end points, which define the chapter DubbingList[n], and information indicating the play item corresponding to the chapter DubbingList[n] are extracted. The play item is determined based on the information indicating the play item, and the timestamps of the IN and OUT points of the determined play item are extracted. That is to say, the block blkPlayItem( ) in the block blkPlayList( ) within a playlist file is determined based on the information indicating a play item (see FIG. 12), and the values of the fields INTime and OUTTime within the determined block blkPlayItem( ) are each extracted. The values of the fields INTime and OUTTime are compared with the timestamps indicated with the playlist marks of the respective start and end points defining the above-mentioned chapter.

Also, the reference relation between play item and clip information can be obtained as follows, for example. With the block blkPlayItem( ) determined based on the information indicating the play item of the chapter DubbingList[n] such as described above, a clip information file is determined based on the value of the field ClipInformationFileName (see FIG. 13). This clip information file is referenced, for example, from the management information in the memory 17, and the block blkCPI( ) within the file is extracted (see FIG. 16). Subsequently, with the block blkEPMap( ) within the extracted block blkCPI( ), the PTS at the time of the loop variable of the third for-loop sentence being set to zero (referred to as top PTS), and the PTS at the time of the loop variable being set to the maximum value, i.e., the value indicated with the field NumberOfStreamPIDEntries (referred to as end PTS) are extracted (see FIGS. 19 and 20). Subsequently, the top PTS and end PTS are compared with the values of the fields INTime and OUTTime in the above-mentioned reference source play item.

Figure 30A:
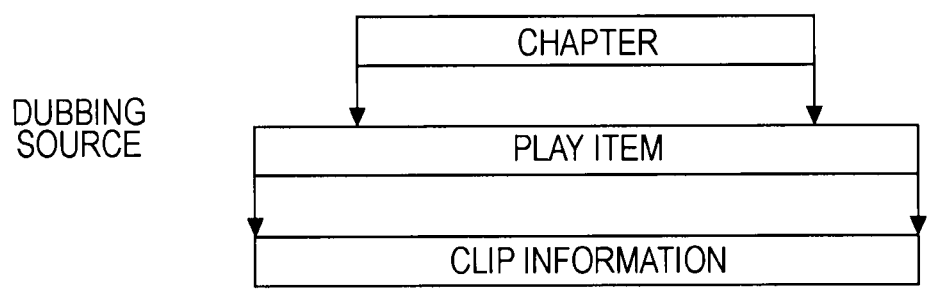
FIG. 30 is a schematic diagram for describing an example wherein a play item and clip information of a dubbing destination are created according to the relation between a chapter, play item, and clip information.

FIG. 30A is an example wherein a dubbing source chapter references a portion of the corresponding play item, and the play item references the entirety of the range of the elementary stream indicated with the corresponding clip information. In this case, as exemplified in FIG. 30B, with regard to the play item, the IN and OUT points are each modified so as to be identical to the start and end points of the chapter, which is employed as a dubbing destination play item, and with regard to the clip information as well, the range of the elementary stream to be referenced is modified so as to be identical to the start and end points of the chapter. With the play item and clip information, the portions other than the range indicated with the start and end points of the chapter are deleted.

More specifically, with regard to the play item, the values of the IN and OUT points are changed to the values of the timestamps of the start and end points of the chapter, which is employed as a dubbing destination play item. With regard to the clip information, the PTS corresponding to the start point of the chapter is taken as the value of the entry PTSEPStart, and the source packet number indicated with the entry SPNEPStart is set to zero, thereby creating dubbing destination clip information.

Figure 30B:
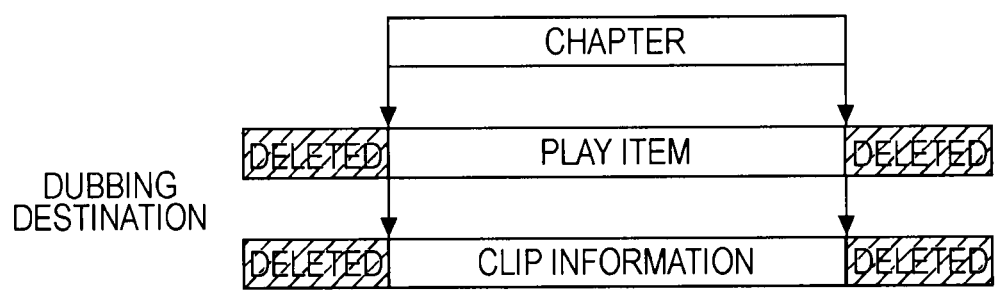
Figure 31A:
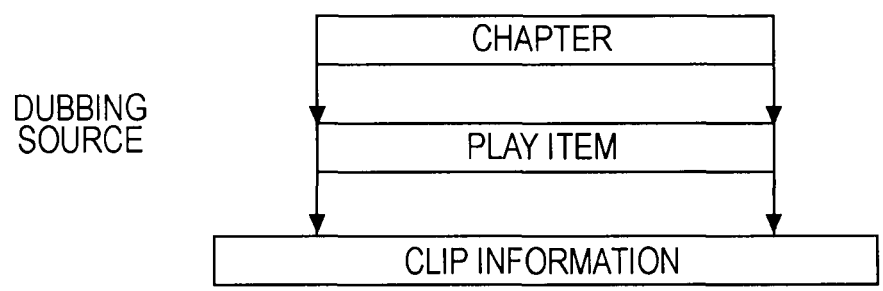
FIG. 31 is a schematic diagram for describing an example wherein a play item and clip information of a dubbing destination are created according to the relation between a chapter, play item, and clip information.

FIG. 31A is an example wherein a dubbing source chapter references the entirety of the corresponding play item, and the play item references a portion of the range of the elementary stream indicated with the corresponding clip information. In this case, as exemplified in FIG. 31B, with regard to the play item, the dubbing source play item can be employed as is as a dubbing destination play item. On the other hand, with regard to the clip information, the range of the elementary stream to be referenced is modified so as to be identical to the start and end points of the chapter (or the IN and OUT points of the corresponding play item). Of the clip information, the portions other than the range indicated with the start and end points of the chapter are deleted, in the same way already described with reference to FIG. 30B.

Figure 31B:
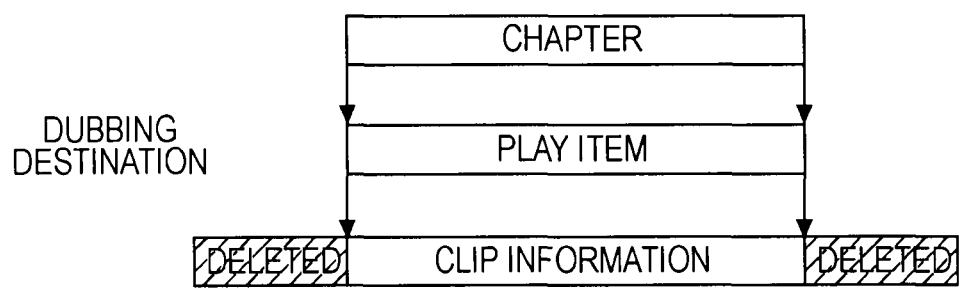
Figure 32A:
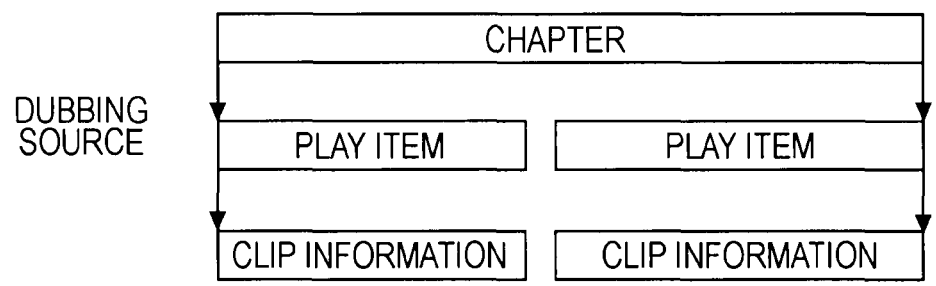
FIG. 32 is a schematic diagram for describing an example wherein a play item and clip information of a dubbing destination are created according to the relation between a chapter, play item, and clip information.
Figure 32B:
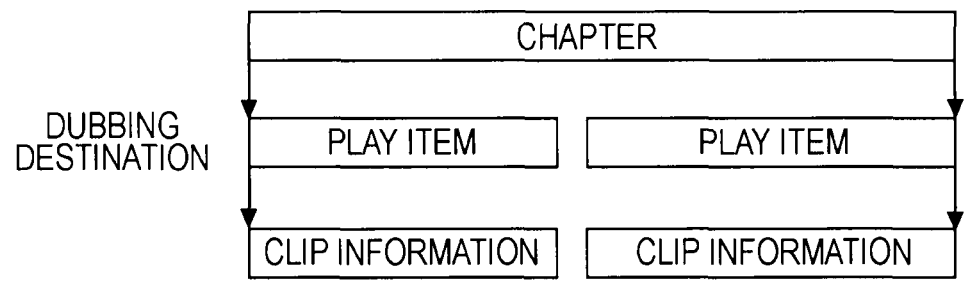

FIG. 32A is an example wherein a dubbing source chapter references multiple play items. In this case, the processing described with FIGS. 29A and 29B, processing described with FIGS. 30A and 30B, and processing described with FIGS. 31A and 31B are combined, thereby creating dubbing destination play item and clip information. For example, in a case wherein with a dubbing source, a chapter references the entirety regarding each of the corresponding play items, and each of the multiple play items references the entirety of the range of the elementary stream indicated with the corresponding clip information, as exemplified in FIG. 32B, the dubbing source play item and clip information can be employed as is as a dubbing destination play item and clip information.

Also, in a case wherein a chapter references multiple play items, as exemplified in the above-mentioned FIGS. 30A, 30B, 31A, and 31B, there may be a case wherein a chapter references a part of the play items, or a case wherein a chapter references the entirety of the play items, but the play items do not reference a part of the elementary stream indicated with clip information (not shown). In these cases as well, in the same way as with the above description, a dubbing destination play item and clip information are created such that each of the multiple play items and multiple pieces of clip information is identical to the range referenced with the chapter.

Description returns to the flowchart in FIG. 27, as described above in step S104, upon a dubbing destination play item and clip information being created, and stored in the memory 17, the processing proceeds to step S105.

Note that at the time of creating clip information, like the above-mentioned examples in FIGS. 30B and 31B, in a case wherein the range of the elementary stream to be referenced is modified, the information of EP entries is reconstructed based on the start and end points of the chapter (in a case wherein the chapter references a part of the play items), or the timestamps of the IN and OUT points of the play items (in a case wherein play items reference a part of the elementary stream). As an example, in the case of FIG. 30B, the entry corresponding to the timestamp of the start point of the chapter is searched from the block blkEPMap( ) in the block blkCPI( ) within the dubbing source clip information file. Subsequently, with the source packet number indicated with that entry as zero, the information of EP entries is reconstructed up to the entry corresponding to the timestamp of the end point of the chapter.

In the next step S105, information indicating seamless connection of the play item referenced by the chapter DubbingList[n-1] immediately before the chapter DubbingList[n] to be processed is determined.

For example, with a dubbing destination, determination is made whether or not the play item referenced by the chapter DubbingList[n] to be processed, and the play item referenced by the chapter DubbingList[n-1] to be played immediately before the chapter DubbingList[n] are seamlessly-connected, and in the case of seamless connection, determination is made whether which connection method is employed of the above-mentioned first seamless connection or second seamless connection. In other words, in step S105, determination is made whether which value is employed of "1", "5", or "6" as the value of the field ConnectionCondition within the block blkPlayItem( ) corresponding to the chapter DubbingList[n] (see FIGS. 13 and 14).

Availability of seamless connection, and seamless connection method regarding a dubbing destination play item are determined based on the relation between the play item corresponding to the dubbing source chapters DubbingList[n] and DubbingList[n-1] and the play item corresponding to the dubbing destination chapters DubbingList[n] and DubbingList[n-1].

4-1-3. Determination Processing Example of Seamless Information

A processing example for determining information indicating the seamless connection of the play item referenced by the chapter to be processed, according to step S105 will be described with reference to the flowchart in FIG. 33. In the first step S120, determination is made whether or not the start point of the chapter DubbingList[n] to be processed is identical to the top, i.e., IN point of the play item referenced by the chapter DubbingList[n]. If determination is made that the start point is not identical to the IN point, seamless connection is determined not to be performed, and the processing proceeds to step S127.

On the other hand, if determination is made in step S120 that the start point of the chapter DubbingList[n] to be processed is identical to the top, i.e., IN point of the play item referenced by the chapter DubbingList[n], the processing proceeds to step S121. In step S121, determination is made whether or not the play item referenced by the chapter DubbingList[n-1] immediately before the chapter DubbingList[n] to be processed is the play item immediately before the play item referenced by the chapter DubbingList[n].

That is to say, determination is made in step S121 whether or not the play item referenced by the chapter DubbingList[n-1] immediately before the chapter DubbingList[n] to be processed is the play item immediately before in play item order in the description on the playlist as to the play item referenced by the chapter DubbingList[n] to be processed. This determination can be made, for example, based on whether or not the value of the field RefToPlayItemID within the block blkPlayListMark( ) shown in FIG. 15 is continuous between the playlist mark corresponding to the start point of the chapter DubbingList[n] to be processed, and the playlist mark corresponding to the end point of the chapter DubbingList[n-1] immediately before the chapter DubbingList[n] to be processed.

If determination is made in step S121 that the play item referenced by the chapter DubbingList[n-1] immediately before the chapter DubbingList[n] to be processed is not the play item immediately before the play item referenced by the chapter DubbingList[n], seamless connection is determined not to be performed, and the processing proceeds to step S127.

On the other hand, if determination is made in step S121 that the play item referenced by the chapter DubbingList[n-1] immediately before the chapter DubbingList[n] to be processed is the play item immediately before the play item referenced by the chapter DubbingList[n], the processing proceeds to step S122. In step S122, determination is made whether or not the end point of the chapter DubbingList[n-1] immediately before the chapter DubbingList[n] to be processed is identical to the OUT point of the play item referenced by the chapter DubbingList[n-1] immediately before the chapter DubbingList[n] to be processed. If determination is made that the end point is not identical to the OUT point, seamless connection is determined not to be performed, and the processing proceeds to step S127.

On the other hand, if determination is made in step S122 that the end point of the chapter DubbingList[n-1] immediately before the chapter DubbingList[n] to be processed is identical to the OUT point of the play item referenced by the chapter DubbingList[n-1] immediately before the chapter DubbingList[n] to be processed, the processing proceeds to step S123. In step S123, determination is made whether or not the value of the field ConnectionCondition of the play item referenced by the chapter DubbingList[n] to be processed is "5", i.e., whether or not the chapter DubbingList[n] to be processed, and the chapter DubbingList[n-1] immediately before the chapter DubbingList[n] to be processed are to be connected with the first seamless connection.

If determination is made that the value is "5", the processing proceeds to step S124, and the value of the field ConnectionCondition of the play item referenced by the chapter is determined to be "5". According to this determination, the value of the field ConnectionCondition of the play item stored in the memory 17 is set to "5".

On the other hand, determination is made in step S123 that the value of the field ConnectionCondition of the play item referenced by the chapter DubbingList[n] to be processed is not "5", the processing proceeds to step S125. In step S125, determination is made whether or not the value of the field ConnectionCondition of the play item referenced by the chapter DubbingList[n] is "6", i.e., whether or not the chapter DubbingList[n] to be processed, and the chapter DubbingList [n-1] immediately before the chapter DubbingList[n] to be processed are to be connected with the second seamless connection.

If determination is made that the value is "6", the processing proceeds to step S126, and the value of the field ConnectionCondition of the play item referenced by the chapter DubbingList[n] is determined to be "6". According to this determination, the value of the field ConnectionCondition of the play item stored in the memory 17 is set to "6".

On the other hand, determination is made in step S126 that the value of the field ConnectionCondition of the play item referenced by the chapter DubbingList[n] to be processed is not "6", seamless connection is determined not to be performed, and the processing proceeds to step S127.

In step S127, the value of the field ConnectionCondition of the play item corresponding to the chapter DubbingList[n-1] immediately before the chapter DubbingList[n] to be processed is determined to be "1". According to this determination, the value of the field ConnectionCondition of the play item stored in the memory 17 is set to "1".

Description returns to the flowchart in FIG. 27, as described above, the information indicating seamless connection of the play item referenced by the chapter to be processed is determined according to step S105, the processing proceeds to step S106. In step S106, based on the clip information created in the above-mentioned step S104, a clip information file is recorded in the dubbing destination recording medium. For example, the management information control unit 16 creates the clip information file of the chapter DubbingList[n] to be processed based on the clip information stored in the memory 17 in accordance with the command of the control unit 30. The created clip information file is supplied to the recording/playback control unit 20, and recorded in the DVD 23 serving as a dubbing destination recording medium by the driving device 22.

In the next step S107, calculation is made whether to copy which range to the dubbing destination recording medium regarding the entity of the stream, i.e., the dubbing source clip AV stream file. The calculation result is stored in the memory 17 as copy range information CopyList[n] relating to the chapter DubbingList[n] in the list CopyList made up of information indicating the copy range corresponding to the chapters selected in step S101. That is to say, the copy range information CopyList[n] is information indicating the copy range of the dubbing source clip AV stream file at the time of copying the chapter DubbingList[n] to the dubbing destination. The copy range information CopyList[n] includes, for example, a dubbing source clip AV stream file name, and information indicating the copy start and end positions of the clip AV stream file with byte positions.

As an example, based on the timestamp information of the start and end points of the chapter DubbingList[n] (or IN and OUT points of a play item), an EP entry is searched from a dubbing source clip information file, and the source packet numbers corresponding to both the start and end points of the chapter DubbingList[n] are obtained. With a source packet, as already described above, the data size is a fixed length, whereby the byte position within a clip AV stream file can be calculated based on the source packet number.

Upon the copy range information CopyList[n] being created in step S107, the processing proceeds to the next step, the variable n is incremented by one. Subsequently, the processing returns to step S103, and the processing as to the next chapter DubbingList[n] is performed.

On the other hand, in the above-mentioned step S103, if determination is made that the processing in steps S104 through S107 regarding all of the chapters within the list DubbingList created in step S101 has been completed, the processing proceeds to step S109. In step S109, a playlist file is created, and recording is performed as to the dubbing destination recording medium. The playlist file created here is a playlist as to all of the chapters indicated with the above-mentioned list DubbingList created in step S101, and includes all of the play items created in step S104.

For example, with the management information processing unit 16, in accordance with the command of the control unit 30, a playlist file is created based on the playlist created and stored in the memory 17 in steps S104 and S105. The created playlist file is supplied to the recording/playback control unit 20, and recorded in the DVD 23 serving as the dubbing destination recording medium by the drive device 22.

Further, in the next step S110, a movie object and index table are created. For example, the management information control unit 16 creates a movie object in the memory 17 based on the playlist file created in step S109. Subsequently, the management information control unit 16 creates a movie object file based on the movie object in the memory 17, supplies this to the recording/playback control unit 20, and records this in the DVD 23 serving as the dubbing destination recording medium. Also, the management information control unit 16 creates the block blkIndexes( ) shown in FIG. 8 calling out that movie object in the memory 17, and creates an index file based on the block blkIndexes( ). This index file is supplied to the recording/playback control unit 20, and recorded in the DVD 23 serving as the dubbing destination recording medium by the drive device 22.

The variable n is set to zero in the next step S111, and according to the following steps S112 through S114, in accordance with the above-mentioned information indicated with the copy range information CopyList[n] created in step S107, the specified range of the dubbing source clip AV stream file is copied to the DVD 23 serving as the dubbing destination recording medium, whereby the clip AV stream file is created on the DVD 23 (step S113). This processing in step S113 is repeated N times while incrementing the variable n by one at a time (step S114), whereby the dubbing as to the DVD 23 serving as the dubbing destination recording medium of the chapters selected in step S101 is completed.

Note that the file name of the clip AV stream file created as to the DVD 23 serving as the dubbing destination recording medium in step S113 is determined so as to correspond to the file name of the above-mentioned clip information file recorded in the DVD 23 in step S107.

As described above, with the first embodiment of the present invention, an arrangement is made wherein at the time of dubbing the chapter selected from the dubbing source recording medium to the dubbing destination recording medium, based on the relation between the selected dubbing source chapter, and the dubbing source play item and clip information corresponding to the chapter, a play item and clip information in the dubbing destination recording medium are created, whereby the dubbing processing of contents in accordance with AVCHD can be readily performed.

Also, at that time, an arrangement is made wherein determination is made whether to perform seamless connection based on the relation between the selected dubbing source chapter and the dubbing source play item and clip information corresponding to the chapter, and in the case of seamless connection being determined to be performed, determination is made automatically whether to perform seamless connection with which method of the first seamless connection and second seamless connection, and based on the determination result, management information for managing seamless connection is recorded in the dubbing destination recording medium. Therefore, the seamless connection state between chapters in the dubbing source can be readily taken over to the dubbing destination.

4-2. Supplement

Also, with the above description, an arrangement has been made wherein the dubbing source recording medium is taken as the hard disk 21, and the dubbing destination recording medium is taken as the DVD 23, but is not restricted to this example. For example, the dubbing destination recording medium may be taken as the detachable memory 24. Further, with the above description, as an example employing a disc-shaped recording medium as the dubbing destination recording medium, the DVD 23 has been employed as the recording medium, but is not restricted to this example, and for example, a Blu-ray Disc (registered trademark) can be employed as the dubbing destination recording medium.

Moreover, with the above description, the hard disk 21 embedded in the recording/playback device 100 has been employed as the dubbing source recording medium, but is not restricted to this example, and a detachable recording medium can be employed as the dubbing source recording medium. With the example in FIG. 25, an arrangement can be conceived wherein the memory 24 is taken as the dubbing source recording medium, and the DVD 23 is taken as the dubbing destination recording medium, or the inverse combination thereof. Also, an arrangement can be conceived wherein a communication interface capable of data communication with another device is provided in the recording/playback device 100, thereby performing dubbing as to a recording medium of another device connected through the communication interface thereof.

5. Modification of First Embodiment of Present Invention

Next, description will be made regarding a modification of the first embodiment of the present invention. With a modification of the first embodiment, the present invention has been applied to a video camera device having an imaging device, and an optical system for entering light from a subject in the imaging device, and configured to record video data in a recording medium based on the imaging signal imaged with the imaging device.

Figure 34:
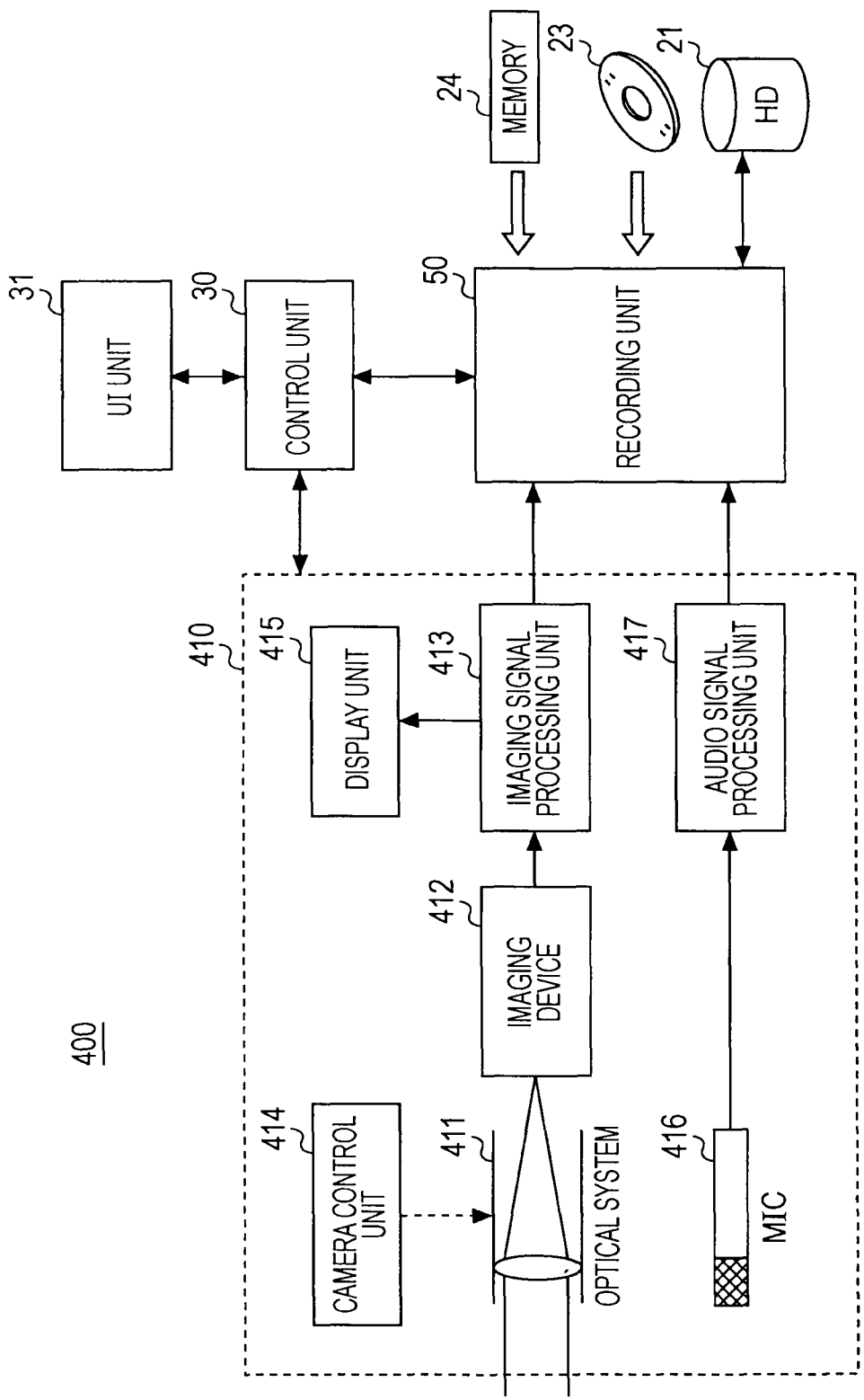
FIG. 34 is a block diagram illustrating a configuration example of a video camera device according to a modification of the first embodiment of the present invention.

FIG. 34 illustrates a configuration example of a video camera device 400 according to a modification of the first embodiment of the present invention. With regard to the configurations of a recording system, playback system, and control system, the configurations of the recording/playback device 100 described with reference to FIG. 25 can be employed generally as is, so the components common to these in FIG. 25 are denoted with the same reference numerals, and the detailed description thereof will be omitted.

With the configuration in FIG. 34, a camera unit 410 includes, as a configuration relating to picture signals, an optical system 31, imaging device 412, imaging signal processing unit 413, camera control unit 414, and display unit 415, and as a configuration relating to audio signals, includes a microphone (MIC) 416 and audio signal processing unit 417. The control unit 30 exchanges various types of control signals and information with each unit of the camera unit 410, and controls the operation of the camera unit 410. Also, the control unit 30 controls the operation of the camera unit 410 based on the control signal supplied from the UI unit 31 in response to the user's operation. Note that in the case of being configured as the video camera device 400, it is common that a recording start operation and recording stop operation are performed, for example, such that a single recording switch provided on the UI unit 31 is employed, and recording start and recording stop are alternately instructed each time the recording switch is pressed.

With the camera unit 410, the optical system 411 includes a lens system for guiding light from a subject to the imaging device 412, aperture adjusting mechanism, focus adjusting mechanism, zooming mechanism, shutter mechanism, and the like. The operations of the aperture adjusting mechanism, focus adjusting mechanism, and shutter mechanism are controlled by the camera control unit 414 based on the control signal supplied from the control unit 30.

The imaging device 412 is made up of, for example, CCD (Charge Coupled Device), converts the light irradiated through the optical system 411 into an electric signal by photoelectric conversion, subjects this to predetermined signal processing, and outputs as an imaging signal. The imaging signal processing unit 413 subjects the imaging signal output from the imaging device to predetermined signal processing, and outputs as digital baseband video data. The imaging device 412 can also be configured with a CMOS (Complementary Metal-Oxide Semiconductor) imager.

For example, the imaging signal processing unit 413 samples only a signal having image information from the imaging signal output from the imaging device 412 using a CDS (Correlated Double Sampling) circuit, eliminates noise from this signal, and adjusts the gain of this signal using an AGC (Auto Gain Control) circuit. Subsequently, the imaging signal processing unit 413 converts that signal into a digital signal by A/D conversion. Also, the imaging signal processing unit 413 subjects that digital signal to signal processing of a detection system, extracts each color component of R (Red), G (Green), and B (Blue) therefrom, performs gamma correction, white balance correction, or the like thereupon, and finally outputs as one piece of digital baseband video data.

Also, the imaging signal processing unit 413 transmits the information of the imaging signal output from the imaging device 412 to the control unit 30. The control unit 30 generates a control signal for controlling the optical system 411 based on that information, and supplies this to the camera control unit 414. The camera control unit 414 performs control of the focus adjusting mechanism, aperture adjusting mechanism, and the like based on that control signal.

Further, the imaging signal processing unit 413 generates a picture signal to be projected on the display unit 415 employing, for example, a LCD (Liquid Crystal Display) as a display element based on the imaging signal output from the imaging device 412.

On the other hand, the microphone 416 collects surrounding audio, converts this into an electric signal, and output this. The audio signal output from the microphone 416 is supplied to the audio signal processing unit 417. The audio signal processing unit 417 subjects the supplied audio signal to A/D conversion through a limiter to obtain digital audio data, subjects this to predetermined audio signal processing such as noise removal, sound quality correction, or the like, and outputs this as digital baseband audio data.

The digital baseband video data output from the imaging signal processing unit 413 of the camera unit 410 is supplied to the recording/playback unit 50 through the terminal 40, and input to the video codec unit 11. Also, the digital baseband audio data output from the audio signal processing unit 417 is supplied to the recording/playback unit 50 through the terminal 42, and input to the audio codec unit 12.

Upon the recording switch provided on the UI unit 31 being pressed from a recording idle state, a control signal for instructing start of recording is supplied to the control unit 30 from the UI unit 31, and recording to the hard disk 21 of the digital video data and digital baseband audio data output from the camera unit 310 is started based on the control of the control unit 30.

That is to say, as already described above, the video data and audio data are subjected to compression encoding at the video codec unit 11 and audio codec unit 12, respectively. The compression-encoded video data and audio data are packetized to source packets having a fixed length in a predetermined manner and multiplexed at the multiplexer 13 to obtain AV stream data. The AV stream data is supplied to the recording/playback control unit 20 through the stream buffer 15, and recorded in the hard disk 21 as a clip AV stream.

Upon the recording switch of the UI unit 31 being pressed, recording is stopped, management information corresponding to the clip AV stream file recorded in the hard disk 21 is generated in a predetermined manner, and recorded in the hard disk 21. For example, the control unit 30 creates a clip information file corresponding to the AV stream file recorded in the hard disk 21 based on the information from the signal processing unit 10 or recording/playback control unit 20. Also, the control unit 30 generates a play item referencing the clip information file, and in the case of a playlist already existing, adds the generated play item to the playlist, and appends a playlist mark to the playlist.

Dubbing processing of a clip recorded in the hard disk 21 to another recording medium, e.g., the DVD 23, or memory 24 is the same as the above-mentioned dubbing processing according to the first embodiment, and accordingly, the detailed description thereof will be omitted here.

6. Second Embodiment of Present Invention

Next, description will be made regarding a second embodiment of the present invention. The present second embodiment is an example for realizing the dubbing processing according to the present invention using a computer 200 having a common configuration such as schematically illustrated in FIG. 35. That is to say, like the recording/playback device 100 according to the above-mentioned first embodiment, the dubbing processing according to the present invention can be realized without including a signal processing system as to video data and audio data such as the video codec unit 11, audio codec unit 12, multiplexer 13, and demultiplexer 14.

6-1. Configuration Example of Device Applicable to Second Embodiment

In FIG. 35, a CPU 211, RAM 212, ROM 213, display control unit 214, and communication interface 215 are each connected to a bus 210. Further, an input interface 220, memory interface 222, read/write control unit 223, and data interface 225 are each connected to the bus 210. The input interface 220 is connected with input devices such as a keyboard 221A and mouse 221B. The read/write control unit 223 is connected with a storage device such as a hard disk 230, and a drive device 224 for reading/writing data from/to a disc-shaped recording medium mounted thereupon.

The CPU 211 performs control of the overall of the computer 200, and executes application software using the RAM 212 as work memory in accordance with a basic program stored in the ROM 213, or a program stored in the hard disk 230. The display control unit 214 generates a signal having a format that can be displayed on the display 215 based on a display control signal generated at the CPU 211 in accordance with a predetermined program, and supplied to the display 215. The communication interface 216 controls communication with the outside in accordance with the command of the CPU 211 based on a predetermined protocol. For example, with the communication interface 216, TCP/IP (Transmission Control Protocol/Internet Protocol) or the like is implemented as a communication protocol, thereby controlling communication with the Internet in accordance with the command of the CPU 211.

The read/write control unit 223 controls reading/writing of data from/to the hard disk 230, and reading/writing of data from/to a recording medium mounted on the drive device 224 in accordance with the command of the CPU 211. Now, let us say that the drive device 224 corresponds to, for example, a recordable type DVD 231, and can read/write data from/to the DVD 231. The read/write control unit 223 controls the operation of the hard disk 230 in accordance with the address specified from the CPU 211, and accesses the address. Similarly, the read/write control unit 223 controls the drive device 224 in accordance with the address specified from the CPU 211, and accesses the address on the DVD 231.

The memory interface 222 controls reading/writing of data from/to the detachable nonvolatile memory 232. In accordance with the address specified from the CPU 211, the memory interface 222 accesses the address on the memory 232.

The data interface 225 is connected to an external device by cable or wirelessly, and exchanges data with the connected device using a predetermined protocol. Examples of an interface specification applicable to the data interface 225 include a serial interface such as USB (Universal Serial Bus), IEEE1394 (Institute Electrical and Electronics Engineers 1394), or the like. It goes without saying that this interface is not restricted to such interfaces, and that another interface specification or standard may be employed.

Various types of programs are stored in the hard disk 230, such as an OS (Operating System) which is software for providing the basic functions in the computer 200 such as a file system, GUI (Graphical User Interface) and the like, application software for realizing the dubbing processing according to the present invention. The programs are recorded in a recording medium such as CD-ROM (Compact Disc-Read Only Memory) or DVD-ROM for example, provided, read out by the drive device 224, and recorded in the hard disk 230 in a predetermined manner, thereby enabling these programs to be executed. The application software for performing the dubbing processing may be provided with an unshown server on the Internet. In this case, the application software is downloaded by accessing the server through the Internet using the communication interface 216 in accordance with the command of the CPU 211. The downloaded application software is stored in the hard disk 230 in a predetermined manner.

For example, upon activation of the application software being instructed by a predetermined operation as to the input device such as the keyboard 221A or mouse 221B, the OS reads out the program of the application software from the hard disk 230, and decompressed in the RAM 212 in a predetermined manner. The CPU 211 performs generation of a display control signal, generation of a reading/writing command as to the read/write control unit 223 or memory interface 222, input reception by the input devices, or the like in accordance with the program decompressed in the RAM 212, thereby executing the application software.

6-2. Dubbing Processing Example According to Second Embodiment

Content data in accordance with AVCHD is input to the computer 200 having such a configuration. The input content data is stored in, for example, the hard disk 230. Note that according to AVCHD, the data needs to have the above-mentioned management structure shown in FIG. 5 or FIG. 6. For example, an arrangement can be conceived wherein a predetermined directory is created in the hard disk 230, and the structure in FIG. 5 or FIG. 6 is constructed as to the directory thereof.

An arrangement can be conceived wherein the data is recorded in the DVD 231, for example, with the structure shown in FIG. 6, and supplied. In this case, it can be conceived that the recorded content of the DVD 231 is copied to the hard disk 230 as is. The method for supplying the data is not restricted to this, so the data may be supplied with data communication from an external device connected to the data interface 225 through a predetermined interface, or may be supplied through the Internet with the communication interface 216.

Now, for example, a new DVD 231 is mounted on the drive device 224, the clips stored in the hard disk 230 are selected in increments of chapters, whereby the chapters can be dubbed to the DVD 231. The dubbing processing is performed under the control of the CPU 211 by activating predetermined application software, and following the application software thereof. This application software performs control of the dubbing processing, and makes up a GUI for prompting the user to perform operations relating to the dubbing processing.

The dubbing processing can be executed generally in the same way as the above-mentioned method described in the first embodiment. That is to say, as shown in the flowchart in FIG. 27, a predetermined directory in the hard disk 230 is referenced by the application software (hereafter, application), the management information, i.e., an index file, movie object file, playlist file, and clip information files are read out (step S100). The read management information is stored in the RAM 212.

Next, based on the management information read out and stored in the RAM 212, a chapter list is created, and a display control signal for displaying this chapter list is generated by the CPU 211. The display control signal is supplied to the display control unit 214, and the selectable chapter list is displayed on the display 215. Based on the display of the display 215, the user selects a chapter to be dubbed from the chapter list using the input device such as the keyboard 221A or mouse 221B. At this time, for example, as described above with reference to the flowchart in FIG. 28, determination can be made whether or not the selected chapter can be dubbed. Based on the selected chapter information, the list DubbingList of the chapter to be dubbed is created, and stored, for example, in the RAM 212.

Figure 33:
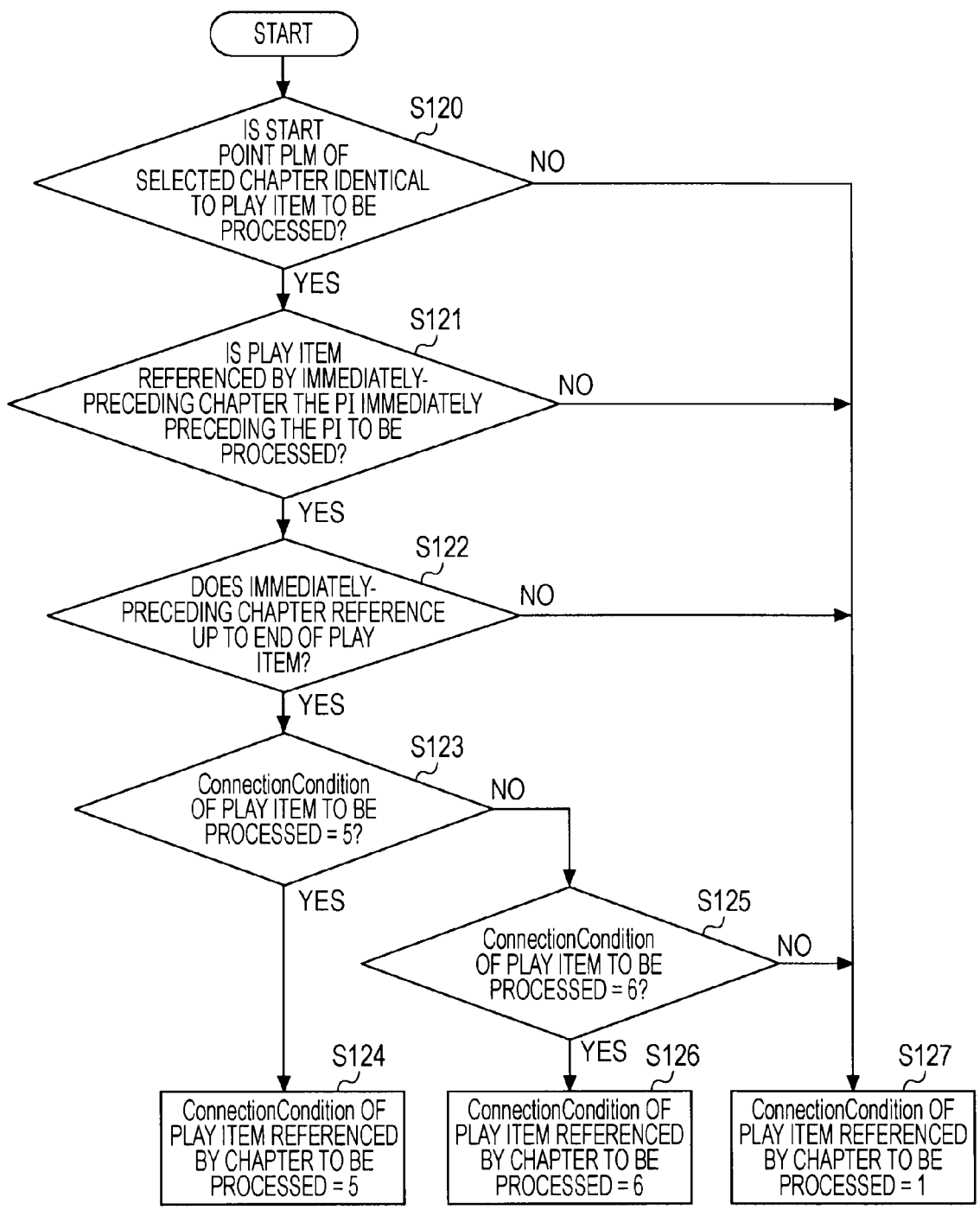
FIG. 33 is a flowchart illustrating a processing example for determining information indicating seamless connection of a play item referenced with a chapter to be processed.

Hereafter, according to the loop in steps S103 through S108, clip information and playlist are created based on the management information stored in the RAM 212 for each chapter shown in the chapter DubbingList (step S104), and the seamless information of the play item (step S105 and each step in FIG. 33). Subsequently, in step S106, the clip information file corresponding to the chapter DubbingList[n] is recorded in the DVD 231. Also, calculation is made whether to copy which portion of the corresponding clip AV stream file to the DVD 231, and the copy range information CopyList[n] is generated (step S107). The copy range information CopyList[n] is stored in the RAM 212 as the information making up the list CopyList.

Upon the processing in steps S104 through S107 being completed regarding all of the selected chapters, a playlist file is created and recorded in the DVD 231 (step S109), a movie object and index table are created, and a movie object file and index file are recorded in the DVD 231 (step S110).

Subsequently, in accordance with the copy range information CopyList[n] stored in the list CopyList stored in the RAM 212, the specified range of the clip AV stream file stored in the hard disk 230 is copied to the DVD 231 (step S113). The copy range of the clip AV stream file is specified as a byte position within the file according to the copy range information CopyList[n]. The application converts the byte position thereof into the address on the hard disk 230 based on the file system of the OS, and reads out data from the address thereof. The read data is transferred to the drive device 224, and recorded in the DVD 231. Upon copy being completed regarding all of the selected chapters, the series of the dubbing processing ends.

Note that with the above description, the dubbing destination recording medium has been taken as the DVD 231 mounted on the drive device 224, but is not restricted to this example. For example, the memory 232 mounted on the memory interface 222 can be taken as the dubbing destination recording medium. Also, another device connected to the data interface 225 through a predetermined interface can also be specified as the dubbing destination. For example, a hard disk controllable through a predetermined interface can be specified as the dubbing destination recording medium. Further, it can be conceived to specify another device connected to the communication interface 216 through the Internet as the dubbing destination.

It should be understood by those skilled in the art that various modifications, combinations, sub-combinations and alterations may occur depending on design requirements and other factors insofar as they are within the scope of the appended claims or the equivalents thereof.

What is claimed is:

1. An editing device configured to dub stream data stored in a source recording medium to a destination recording medium, comprising:

a recording unit configured to record data in said destination recording medium;

a recording control unit configured to control said recording unit in recording specified ranges of the stream data to the destination medium, based on source management information stored in the source recording medium; and a management information generating unit configured to generate destination management information based on a predetermined relationship between the specified ranges of the stream data and said source management information, which corresponds to the specified ranges of the stream data, wherein the destination management information includes:

a stream information file that stores playback point-in-time information and address information of the stream data, and a playback list file that stores playback section data that specifies a playback section by setting a playback start point and playback end point for the stream data, and mark information indicating the playback point-in-time information for the stream data;

when dubbing the specified ranges of the stream data, said management information generating unit determines whether a seamless connection is to be performed between first and second ranges of the specified ranges based on a comparison of timing information corresponding to the first and second ranges, the timing information being included in the source management information, and generates connection state information indicating a seamless connection state between the first and second ranges when the seamless connection is determined to be performed;

the recording control unit includes the generated connection state information, as additional management information that performs playback control to consecutively play the specified ranges of the stream data at frame timing on the destination medium, in the generated destination management information, and records the destination management information in said destination recording medium such that consecutive playback control between the first and second ranges is performed at the destination recording medium; and said management information generating unit determines whether the seamless connection is to be performed between said first range and said second range based on whether the playback start point of said first range is identical to said playback start point of said playback section data corresponding to the first range.

2. The editing device according to claim 1, wherein said specified range is specified based on said mark information.

3. The editing device according to claim 2, wherein said management information generating unit generates said stream information so as to be identical to said specified ranges.

4. The editing device according to claim 2, wherein said management information generating unit generates said playback section data such that said playback section is identical to said specified ranges.

5. The editing device according to claim 1, wherein said management information generating unit determines whether seamless connection is to be performed between said first range and said second range based on whether said playback section data corresponding to said second range refers to a playback section immediately after the playback section indicated with said playback section data corresponding to said first range.

6. The editing device according to claim 1, wherein said management information generating unit determines whether seamless connection is to be performed between said first range and said second range, based on whether the playback end point of said second range is identical to said playback end point of said playback section data corresponding to the second range.

7. The editing device according to claim 1, wherein said source recording medium is employed fixedly as to a casing.

8. The editing device according to claim 1, wherein said destination recording medium is detachable as to a casing.

9. The editing device according to claim 1, wherein said recording control unit determines whether to record the ranges of the stream data based on said source management information corresponding to a stream file to be recorded from said source recording medium.

10. The editing device according to claim 9, wherein:

said source management information includes information indicating a bit rate of stream data stored in the corresponding stream file; and said recording control unit performs said determination based on said information indicating the bit rate included in said source management information.

11. An editing method configured to dub stream data stored in a source recording medium to a destination recording medium, comprising:

recording data in said destination recording medium;

controlling said recording by a recording control unit configured to record specified ranges of the stream data to the destination medium, based on source management information stored in the source recording medium; and generating destination management information by a management information generating unit based on a predetermined relationship between the specified ranges of the stream data and said source management information, which corresponds to the specified ranges of the stream data, wherein the destination management information includes:

a stream information file that stores playback point-in-time information and address information of the stream data, and a playback list file that stores playback section data that specifies a playback section by setting a playback start point and playback end point for the stream data, and mark information indicating the playback point-in-time information for the stream data;

when dubbing the specified ranges of the stream data, said management information generating unit determines whether a seamless connection is to be performed between first and second ranges of the specified ranges based on a comparison of timing information corresponding to the first and second ranges, the timing information being included in the source management information, and generates connection state information indicating a seamless connection state between the first and second ranges when the seamless connection is determined to be performed;

the recording control unit includes the generated connection state information, as additional management information that performs playback control to consecutively play the specified ranges of the stream data at frame timing on the destination medium, in the generated destination management information, and records the destination management information in said destination recording medium such that consecutive playback control between the first and second ranges is performed at the destination recording medium; and said management information generating unit determines whether the seamless connection is to be performed between said first range and said second range based on whether the playback start point of said first range is identical to said playback start point of said playback section data corresponding to the first range.

12. A non-transitory computer readable storage medium which stores instructions for causing one or more processors to execute an editing method configured to dub stream data stored in a source recording medium to a destination recording medium, said editing method comprising:

recording data in said destination recording medium;

controlling said recording such that specified ranges of the stream data are recorded to the destination medium, based on source management information stored in the source recording medium; and generating destination management information based on a predetermined relationship between the specified ranges of the stream data and said source management information, which corresponds to the specified ranges of the stream data, wherein the destination management information includes:
- a stream information file that stores playback point-in-time information and address information of the stream data, and
- a playback list file that stores playback section data that specifies a playback section by setting a playback start point and playback end point for the stream data, and mark information indicating the playback point-in-time information for the stream data;

when dubbing the specified ranges of the stream data, one or more processors determine whether a seamless connection is to be performed between first and second ranges of the specified ranges based on a comparison of timing information corresponding to the first and second ranges, the timing information being included in the source management information, and generates connection state information indicating a seamless connection state between the first and second ranges when the seamless connection is determined to be performed;

the generated connection state information is included, as additional management information that performs playback control to consecutively play the specified ranges of the stream data at frame timing on the destination medium, in the generated destination management information, and the destination management information is recorded in said destination recording medium such that consecutive playback control between the first and second ranges is performed at the destination recording medium; and the one or more processors determine whether the seamless connection is to be performed between said first range and said second range based on whether the playback start point of said first range is identical to said playback start point of said playback section data corresponding to the first range.

13. A data processing device comprising:
a recording control unit configured to perform recording control such that specified ranges of stream data are recorded to a destination recording medium, based on source management information stored in a source recording medium; and
a management information generating unit configured to generate destination management information based on a predetermined relationship between said specified ranges of the stream data and said source management information, wherein
when dubbing the specified ranges of the stream data, said management information generating unit determines whether a seamless connection is to be performed between first and second ranges of the specified ranges based on a comparison of timing information corresponding to the first and second ranges, the timing information being included in the source management information, and generates connection state information indicating a seamless connection state between the first and second ranges when the seamless connection is determined to be performed;
the recording control unit includes the generated connection state information, as additional management information that performs playback control to consecutively play the specified ranges of the stream data at frame timing on the destination recording medium, in the destination management information, and records the destination management information in said destination recording medium such that consecutive playback control between the first and second ranges is performed at the destination recording medium; and said management information generating unit determines whether the seamless connection is to be performed between said first range and said second range based on whether a playback start point of said first range is identical to a playback start point of playback section data corresponding to the first range, the playback section data being included in the destination management information.

14. A data processing method comprising:
performing recording control by a recording control unit such that specified ranges of stream data are recorded to a destination recording medium, based on source management information stored in a source recording medium; and
generating destination management information by a management information generating unit based on a predetermined relationship between said specified ranges of the stream data and said source management information, wherein
when dubbing the specified ranges of the stream data, said management information generating unit determines whether a seamless connection is to be performed between first and second ranges of the specified ranges based on a comparison of timing information corresponding to the first and second ranges, the timing information being included in the source management information, and generates connection state information indicating a seamless connection state between the first and second ranges when the seamless connection is determined to be performed;
the recording control unit includes the generated connection state information, as additional management information that performs playback control to consecutively play the specified ranges of the stream data at frame timing on the destination medium, in the generated destination management information, and records the destination management information in said destination recording medium such that consecutive playback control between the first and second ranges is performed at the destination recording medium; and
said management information generating unit determines whether the seamless connection is to be performed between said first range and said second range based on whether a playback start point of said first range is identical to a playback start point of playback section data corresponding to the first range, the playback section data being included in the destination management information.

15. A non-transitory computer readable storage medium which stores instructions for causing one or more processors to execute a data processing method comprising:
performing recording control such that specified ranges of stream data are recorded to a destination recording medium, based on source management information stored in a source recording medium; and
generating destination management information based on a predetermined relationship between said specified ranges of the stream data and said source management information, wherein
when dubbing the specified ranges of the stream data, the one or more processors determine whether a seamless connection is to be performed between first and second ranges of the specified ranges based on a comparison of timing information corresponding to the first and second ranges, the timing information being included in the source management information, and generates connection state information indicating a seamless connection state between the first and second ranges when the seamless connection is determined to be performed;

the generated connection state information is included, as additional management information that performs playback control to consecutively play the specified ranges of the stream data at frame timing on the destination medium, in the destination management information, and the generated destination management information is recorded in said destination recording medium such that consecutive playback control between the first and second ranges is performed at the destination recording medium; and the one or more processors determine whether the seamless connection is to be performed between said first range and said second range based on whether a playback start point of said first range is identical to a playback start point of playback section data corresponding to the first range, the playback section data being included in the destination management information.

16. The editing device of claim 1, wherein said management information generating unit further determines whether a seamless connection is to be performed between the first and second ranges of the specified ranges based on a connection condition included in the source management information, the connection condition indicating the first range and the second range are connected seamlessly in the source recording medium.

* * * * *